(12) United States Patent
Sandland et al.

(10) Patent No.: US 10,984,034 B1
(45) Date of Patent: Apr. 20, 2021

(54) DIALOGUE MANAGEMENT SYSTEM WITH HIERARCHICAL CLASSIFICATION AND PROGRESSION

(71) Applicant: Cyrano.ai, Inc., Newport Beach, CA (US)

(72) Inventors: Scott Douglas Sandland, Newport Beach, CA (US); Daniel Paris, San Diego, CA (US)

(73) Assignee: Cyrano.ai, Inc., Newport Beach, CA (US)

( * ) Notice: Subject to any disclaimer, the term of this patent is extended or adjusted under 35 U.S.C. 154(b) by 774 days.

(21) Appl. No.: 15/726,265

(22) Filed: Oct. 5, 2017

Related U.S. Application Data

(60) Provisional application No. 62/404,642, filed on Oct. 5, 2016.

(51) Int. Cl.
*G06F 16/35* (2019.01)
*G06F 16/332* (2019.01)
(Continued)

(52) U.S. Cl.
CPC ........ *G06F 16/353* (2019.01); *G06F 16/3329* (2019.01); *G06F 16/3344* (2019.01);
(Continued)

(58) Field of Classification Search
CPC . G10L 15/22; G10L 15/1822; G10L 15/1815; G10L 15/183; G10L 15/19;
(Continued)

(56) References Cited

U.S. PATENT DOCUMENTS 6,587,846 B1 7/2003 LaMuth
7,158,966 B2 1/2007 Brill et al.
(Continued)

FOREIGN PATENT DOCUMENTS

GB 2 354 089 A 3/2001
GB 2 354 089 B 3/2001
(Continued)

OTHER PUBLICATIONS

Abushawar, Bayan. Sarah Chatbot Re-Wochat 2016—Shared Task Chatbot Description Report, 2 pages, Arab Open University, Amman, Jordan.
(Continued)

*Primary Examiner* — Dennis Truong
(74) *Attorney, Agent, or Firm* — Knobbe, Martens, Olson & Bear, LLP

(57) ABSTRACT

A dialogue management system applies hierarchical classifiers and other natural language processing to dialogue input, and determines whether performance of an action is likely to occur. The dialogue management system may process dialogue input to assess a dialogue participant's current position in various hierarchies or other classification schemes associated with performance of a desired action. The system may then present results of the assessment to another dialogue participant or provide the results to another system. In some embodiments, the dialogue management system may automatically generate responses or questions designed to engage a dialogue participant and cause the participant to progress through the levels of a hierarchy toward performance of a desired action.

20 Claims, 12 Drawing Sheets

(51) Int. Cl.
*G06F 16/9032* (2019.01)
*G06F 16/33* (2019.01)
*G06N 3/02* (2006.01)
*G06N 20/20* (2019.01)
*G10L 15/19* (2013.01)
*G10L 15/183* (2013.01)
*G10L 15/18* (2013.01)
*G06N 3/08* (2006.01)

(52) U.S. Cl.
CPC ......... *G06F 16/90332* (2019.01); *G06N 3/02* (2013.01); *G06N 3/08* (2013.01); *G06N 20/20* (2019.01); *G10L 15/183* (2013.01); *G10L 15/1822* (2013.01); *G10L 15/19* (2013.01)

(58) Field of Classification Search
CPC ....... G10L 15/193; G10L 25/63; G06F 40/20; G06F 16/3329; G06F 16/90332; G06F 40/40; G06F 16/3344; G06F 40/253; G06F 40/56; G06N 20/00; G06N 7/005
See application file for complete search history.

(56) References Cited

U.S. PATENT DOCUMENTS

| | | | |
|---|---|---|---|
| 7,236,963 | B1 | 6/2007 | LaMuth |
| 7,293,015 | B2* | 11/2007 | Zhou ................. G06F 40/253 |
| 8,204,751 | B1* | 6/2012 | Di Fabbrizio ........ G06F 40/211 704/275 |
| 8,670,979 | B2* | 3/2014 | Gruber ...................... G06F 9/54 704/9 |
| 8,949,377 | B2 | 2/2015 | Makar et al. |
| 8,977,584 | B2 | 3/2015 | Jerram et al. |
| 9,053,431 | B1* | 6/2015 | Commons ................. G06N 3/08 |
| 9,302,393 | B1* | 4/2016 | Rosen ..................... G06N 3/008 |
| 2005/0105712 | A1* | 5/2005 | Williams ............ H04M 3/5166 379/265.02 |
| 2005/0222712 | A1 | 10/2005 | Orita |
| 2006/0293921 | A1 | 12/2006 | McCarthy et al. |
| 2007/0005539 | A1* | 1/2007 | Bergman ............... G06N 20/00 706/21 |
| 2007/0162442 | A1 | 7/2007 | Brill et al. |
| 2007/0203863 | A1* | 8/2007 | Gupta .................... G06N 20/00 706/20 |
| 2009/0292687 | A1* | 11/2009 | Fan .......................... G06N 5/04 |
| 2010/0057463 | A1* | 3/2010 | Weng ....................... G06F 40/20 704/257 |
| 2012/0041903 | A1* | 2/2012 | Beilby ................... H04L 51/02 706/11 |
| 2014/0012798 | A1* | 1/2014 | Visel ........................ G06N 3/10 706/55 |
| 2014/0164476 | A1* | 6/2014 | Thomson ............. G06Q 10/101 709/203 |
| 2014/0270108 | A1 | 9/2014 | Riahi et al. |
| 2014/0310001 | A1* | 10/2014 | Kalns ..................... G10L 15/32 704/270.1 |
| 2014/0337009 | A1 | 11/2014 | Kau et al. |
| 2015/0142704 | A1* | 5/2015 | London ................. G06N 5/022 706/11 |
| 2015/0278889 | A1 | 10/2015 | Qian |
| 2016/0071022 | A1* | 3/2016 | Bruno ................. G06F 16/3349 706/12 |
| 2016/0253434 | A1* | 9/2016 | Yu ..................... G06F 16/90332 707/760 |
| 2016/0300570 | A1* | 10/2016 | Gustafson ............... G10L 25/51 |
| 2016/0352656 | A1* | 12/2016 | Galley ................. G06N 3/0454 |
| 2018/0052842 | A1* | 2/2018 | Hewavitharana ....... G06F 40/58 |
| 2018/0052884 | A1* | 2/2018 | Kale ....................... G06N 5/04 |

FOREIGN PATENT DOCUMENTS

| | | |
|---|---|---|
| KR | 1020050033918 A | 4/2005 |
| KR | 1020100123206 A | 11/2010 |
| KR | 2020140042994 A | 4/2014 |
| WO | WO 00/28427 | 5/2000 |
| WO | WO 00/70481 | 11/2000 |

OTHER PUBLICATIONS

Banchs, Rafae, et al. IRIS (Informal Response Interactive System) Re-Wochat 2016—Shared Task Chatbot Description Report, Institute for Infocomm Research, 2 pages, Singapore.
Broersma, E. Computer-generated Dialogues through Sequential Pattern Mining, 74 pages, Universiteit Utrecht, Dec. 12, 2012.
Conversica, AI Software for Marketing and Sales, May 3, 2016, www.conversica.com (retrieved from https://web.archive.org/web/20160503081254/https://www.conversica.com/), 11 pages.
Chai, Joyce, et al. Natural Language Sales-Assistant—A Web-based Dialog System for Online Sales, IAAI, 2001, AAAI (www.aaai.org) 8 pages.
D'Haro, Luis, et al. Shared Task on Data Collection and Annotation, Re-Wochat 2016—Shared Task Description Report, Institute for Infocomm Research, 4 pages.
D'Haro, Luis Fernando. PyEliza: A Python-based implementation of the famous computer therapist. Re-Wochat 2016—Shared Task Chatbot Description Report, Institute for Infocomm Research, 2 pages, Singapore.
Durbin, S., et al. Information Self-Service with a Knowledge Base That Learns, AI Magazine, 2002, 10 pages, vol. 23, No. 4, AAAI.
Durbin, S. et al. RightNow eService Center: Internet customer service using a self-learning knowledge base, IAAI, 2001, AAAI (www.aaai.org) 2002, 7 pages.
Gustavsson, Eva. Virtual Servants: Stereotyping Female Front-Office Employees on the Internet, Sep. 2005, 20 pages, vol. 12, No. 5, Gender, Work and Organization.
Kubon, David, et al. Politician, Re-Wochat 2016—Shared Task Chatbot Description Report, 2 pages, Charles University in Prague.
Sun, Guili. XML-Based Agent Scripts and Interface Mechanisms, 2003, 55 pages, University of North Texas.
Yu, Zhou. TickTock, Re-Wochat 2016—Shared Task Chatbot Description Report, 2 pages, Carnegie Mellon University.

* cited by examiner

US 10,984,034 B1

DIALOGUE MANAGEMENT SYSTEM WITH HIERARCHICAL CLASSIFICATION AND PROGRESSION

CROSS-REFERENCE TO RELATED APPLICATION

This application claims priority to U.S. Provisional Patent Application No. 62/404,642, filed Oct. 5, 2016, which is incorporated by reference herein in its entirety.

BACKGROUND

Natural language processing systems include various components for receiving input from a user and processing the input to determine what the user means. In some implementations, a natural language processing system receives textual input, such as text entered by a user or a transcription of a user's utterance. The natural language processing system can determine the meaning of the textual input in a way that can be acted upon by a computer application. For example, a user of a mobile phone may speak a command to initiate a phone call. Audio of the spoken command can be transcribed by an automatic speech recognition module. The natural language processing system can then determine the user's intent from the transcription (e.g., that the user wants to initiate the phone call feature) and generate a command to initiate the phone call.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
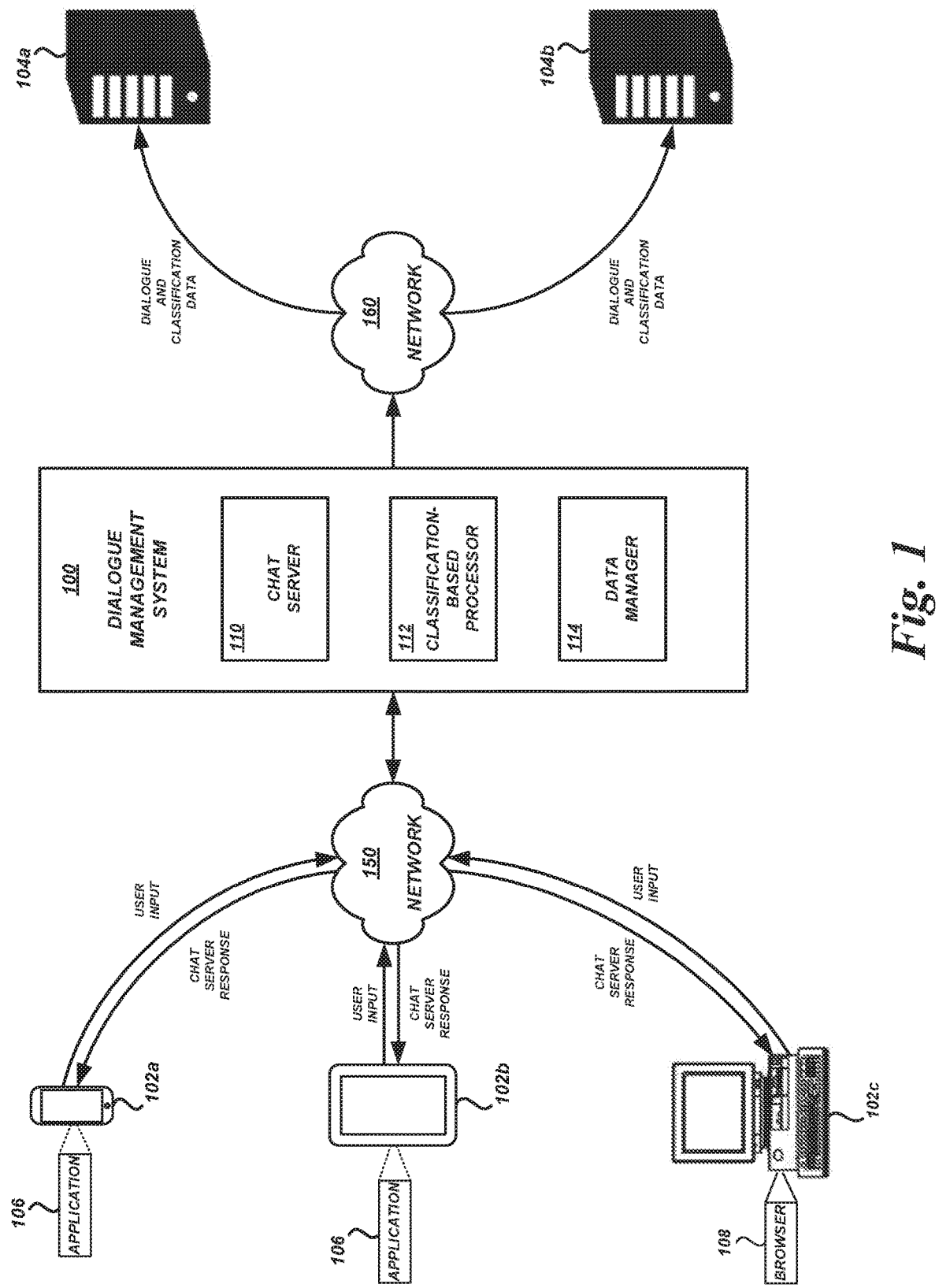
FIG. 1 is a block diagram of an illustrative computing environment including various user devices, a dialogue management system, and various data consumers according to some embodiments.

Computing systems may use natural language processing ("NLP") subsystems to process natural language input (e.g., text-based input typed by a user, speech input that has been processed into a textual transcription, etc.) and extract information from the input. In some implementations, NLP subsystems may be used to determine information about a source of the input and/or to determine information that the system is to output. From the perspective of a user interacting with an NLP-based system, the system's performance may be defined in terms of the degree to which output from the system and actions taken by the system comport with the input provided to the system. From the perspective of a developer or operator of a natural language processing system, the system's performance may be defined in terms of the number or proportion of transactions performed automatically and successfully.

Some conventional dialogue management systems use NLP to determine which command a dialogue participant is requesting the system to execute. Other conventional dialogue management systems attempt to generate a profile of a dialogue participant. In some cases, a dialogue management system attempts to obtain as much information as possible during a multi-turn dialogue by making the dialogue last as long as possible. However, these and other such systems fail to assess the current state of the dialogue or dialogue participant, and then generate output specifically tailored to change the state of the dialogue or dialogue participant towards a desired action. Instead, such conventional systems merely aim to understand the action that a user wishes to initiate, or they aim to collect information about a user.

Aspects of the present disclosure are directed to a dialogue management system that applies hierarchical classifiers and other natural language processing methods to dialogue input, and determines whether performance of an action is likely to occur. The dialogue management system may process dialogue input to assess a current position in various hierarchies or other classification schemes associated with performance of a desired action. The system may then automatically generate output (e.g., responses or questions) based on the assessment. A system that implements some or all of these features can intelligently engage a dialogue participant such that over the course of a multi-turn dialogue the participant progresses through the levels of a hierarchy toward performance of a desired action. Moreover, a system that implements these features can perform functions not previously performable by automated systems, including generating output specifically formulated to provoke input that progresses the dialogue through the levels of a hierarchy and toward performance of a desired action. By implementing these features, a computing system can go beyond mere dialogue automation, and may provide intelligent steering of a dialogue and analysis thereof to provide insights and provoke responses not previously possible in a single, real-time dialogue of any kind.

Some aspects of the present disclosure relate to using NLP and classifiers to assess a likelihood associated with a dialogue (e.g., a likelihood that a dialogue participant will perform a desired action). A dialogue participant—also referred to as a participant, user, client, or customer—may access a dialogue-based interface to obtain information about a possible action, such as scheduling an appointment or making a purchase. The participant may engage in a multi-turn dialogue in which the participant asks questions, answers questions, makes selections, and/or provides other input. The input can be processed using one or more classifiers to determine a current hierarchal level for the participant. For example, a particular hierarchy may consist of levels through which a participant is expected to progress before performing an action. The levels may not be "checkpoints" through which a user progresses in a strictly linear fashion. Rather, a participant may start off at a lowest level (farthest away from performing an action) and progress to a higher level over the course of time (closer to performing an action). The participant may then continue progressing to higher levels, remain at a particular level, or regress to a lower level through which the participant had previously progressed. The progression/regression may occur indefinitely, and there may be no requirement that the participant reaches or remains at any particular level.

Additional aspects of the present disclosure relate to intelligently generating responses or other dialogue turns such that subsequent input from the dialogue participant will result in a change to the hierarchy level classification described above. The dialogue management system can process input from the dialogue participant over the course of multiple dialogue turns and determine various classifications from the processed input. In some embodiments, the dialogue management system can select or generate a dialogue response based on some combination of classification results. For example, the dialogue management system may have a collection of dialogue responses or response templates. Individual responses or response templates may be associated with a set of classifications, and may be designed to elicit input from the dialogue participant that causes a progression in the hierarchy level classification that the system determines for the participant. The elicited input may directly affect the level classification (e.g., the level classification may progress to the next higher level making it more likely that the participant will perform a desired action). In some cases the elicited input may be used to select or generate a subsequent response or prompt that causes a change to the level classification. In addition, the real-time or substantially real-time manner in which the system intelligently generates responses ensures that the current state of the dialogue and/or dialogue participant, as assessed using the classifiers described herein, has not changed due to the mere passage of time between input and subsequent output. By ensuring that the dialogue remains active in substantially real-time (e.g., a response is generated by the system within about 30 seconds, or within about 15 seconds, or within about 5 seconds, or within about 1 second of receiving an input), the assessment remains valid through the generation of output and receipt of subsequent input, if any.

Although aspects of some embodiments described in the disclosure will focus, for the purpose of illustration, on particular examples of classifiers, dialogues, and desired actions, the examples are illustrative only and are not intended to be limiting. In some embodiments, the techniques described herein may be applied to additional or alternative classifiers, dialogue, or actions. Various aspects of the disclosure will now be described with regard to certain examples and embodiments, which are intended to illustrate but not limit the disclosure.

Network-Based Dialogue Management Environment

With reference to an illustrative embodiment, FIG. 1 shows a network environment in which aspects of the present disclosure may be implemented. As shown, the network environment may include a dialogue management system 100, various user devices 102a, 102b, and 102c (collectively "user devices 102"), and various data consumers 104a and 104b (collectively "data consumers 104"). The user devices 102 and dialogue management system 100 may communicate with each other via one or more communication networks 150. The data consumers 104 and dialogue management system 100 may also communicate with each other via one or more communication networks 160. A communication network 150 or 160 may be a publicly accessible network of linked networks, possibly operated by various distinct parties, such as the Internet. In other embodiments, a network 150 or 160 may include a private network, personal area network, local area network, wide area network, cable network, satellite network, cellular telephone network, etc. or a combination thereof, some or all of which may or may not have access to and/or from the Internet. Although two separate communication networks 150 and 160 are shown, in some embodiments the user devices 102 and data consumers 104 (or some subset thereof) may each communicate with the dialogue management system 100 via the same communication network.

The dialogue management system 100 may include various components for providing the features described herein. Illustratively, the dialogue management system 100 may include a chat server 110 to obtain input from user devices 102, provide such input (or data derived therefrom) to other components of the dialogue management system 100, and provide output to user devices 102. The dialogue management system 100 may also include a classification-based processor 112 that receives dialogue input via the chat server 110, performs classification and other natural language processing, and generates responses for presentation via the chat server 110. The dialogue management system 100 may also include a data manager 114 that maintains data regarding dialogues and users, and manages the provision of such data to data consumers 104. The example components and data stores of the dialogue management system 100 shown in FIG. 1 are illustrative only, and are not intended to be limiting. In some embodiments, a dialogue management system 100 may have fewer, additional, and/or alternative components and data stores.

The dialogue management system 100 may be implemented on one or more physical server computing devices that provide computing services and resources to user devices 102 and data consumers 104. In some embodiments, the dialogue management system 100 (or individual components thereof, such as the chat server 110, classification-based processor 112, etc.) may be implemented on one or more host devices, such as blade servers, midrange computing devices, mainframe computers, desktop computers, or any other computing device configured to provide computing services and resources. For example, a single host device may execute one or more chat servers 110, one or more classification-based processor 112, one or more data managers 114, some combination thereof, etc. The dialogue management system 100 may include any number of such hosts.

In some embodiments, the features and services provided by the dialogue management system 100 may be implemented as web services consumable via communication networks 150 and 160. In further embodiments, the dialogue management system 100 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

The individual user devices 102 may be any of a wide variety of computing devices, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. A dialogue participant may operate a user device 102 to access and interact with the dialogue management system 100. In some embodiments, a dialogue participant may launch specialized application software, such as a mobile application 106 executing on a particular user device, such as a smart phone 102a or tablet computer 102b. The application 106 may be specifically designed to interface with the dialogue management system 100 (or chat servers in general) for conducting multi-turn dialogs or "chats." In some embodiments, a user may use other application software, such as a browser application 108, to interact with the dialogue management system 100.

The individual data consumers 104 may be any of a wide variety of computing systems, including the computing systems described above with respect to the dialogue management system and/or the user devices 102. The data consumers 104 may be operated by or otherwise associated with entities that use data obtained or generated by the dialogue management system 100. For example, a data consumer 104a may be operated by an automobile dealership to obtain data from the dialogue management system 100 regarding sales leads, committed test drive appointments, likely sales, and the like. As another example, a data consumer 104b may be operated by a therapist to obtain data regarding potential clients, committed appointments, and the like. In some embodiments there may be no separation or physical distinction between a dialogue management system 100 and data consumer 104. Instead, an entity (e.g., car dealership, therapist, etc.) may operate its own dialogue management system 100 and consume data generated or obtained by the dialogue management system 100. In some embodiments, a data consumer may provide information or functionality to the dialogue management system 100 for use in managing dialogues. For example, a car dealership can provide information regarding the cars currently available for sale.

When a user accesses an application 106 on a user device 102a to retrieve content, the user device 102a may establish a connection with the dialogue management system 100 via the network 150. The user device 102a may receive an initial prompt from a chat server 110 of the dialogue management system 100 via the connection. The prompt may be a general greeting, a specific question, a request for login credentials, etc. Illustratively, the prompt may be displayed in text form or presented audibly using text-to-speech ("TTS") processing. A user of the user device 102a can respond to the prompt (or otherwise interact with the dialogue management system 100) by entering text or uttering a response that is converted to text using automatic speech recognition ("ASR") processing. The user's response can be transmitted to the dialogue management system 100 for processing by the chat server 110.

The chat server 110 can provide the user's input (or data derived therefrom, such as an ASR transcript of a spoken utterance) to the classification-based processor 112. The classification-based processor 112 may use one or more classifiers to determine one or more classifications of the current state of the dialogue with the user. A response to the user's input may then be selected to further the dialogue (e.g., to respond to a specific question of the user, to obtain additional required or desired information from the user, to elicit a user response that will alter the classification or other aspects of the dialogue state, etc.). The response may then be provided to the chat server 110, which can handle transmission of the response to the appropriate user device 102a in the appropriate manner. The interactions may continue each time an input is received from the same user device 102a and/or from other user devices 102b or 102c.

In some embodiments, responses to user input may be provided by another person rather than generated via an automatic process. For example, a system administrator or representative associated with a data consumer 104 may engage in a real-time (or substantially real-time) conversation with a user. In such cases, the dialogue management system 100 may serve as an intermediary. A user (e.g., a customer, sales lead, patient, potential patient, etc.) may provide input as discussed above and in greater detail below. The input can then be processed by the classification-based processor 112 to determine classifications as discussed above and in greater detail below. However, rather than automatically generating a response, the dialogue management system 100 can provide the user's input and the determined classifications to another person. A display interface, such as the graphical user interface ("GUI") shown in FIG. 12, may be presented to the other person. The other person can then read the conversation thus far, see the classifications determined by the classification-based processor 112, and provide a response to the latest user input (or provide ad-hoc output to the other user). The chat server 110 can receive the response and transmit the response to the appropriate user device 102.

Example Classification-Based Processor

Figure 2:
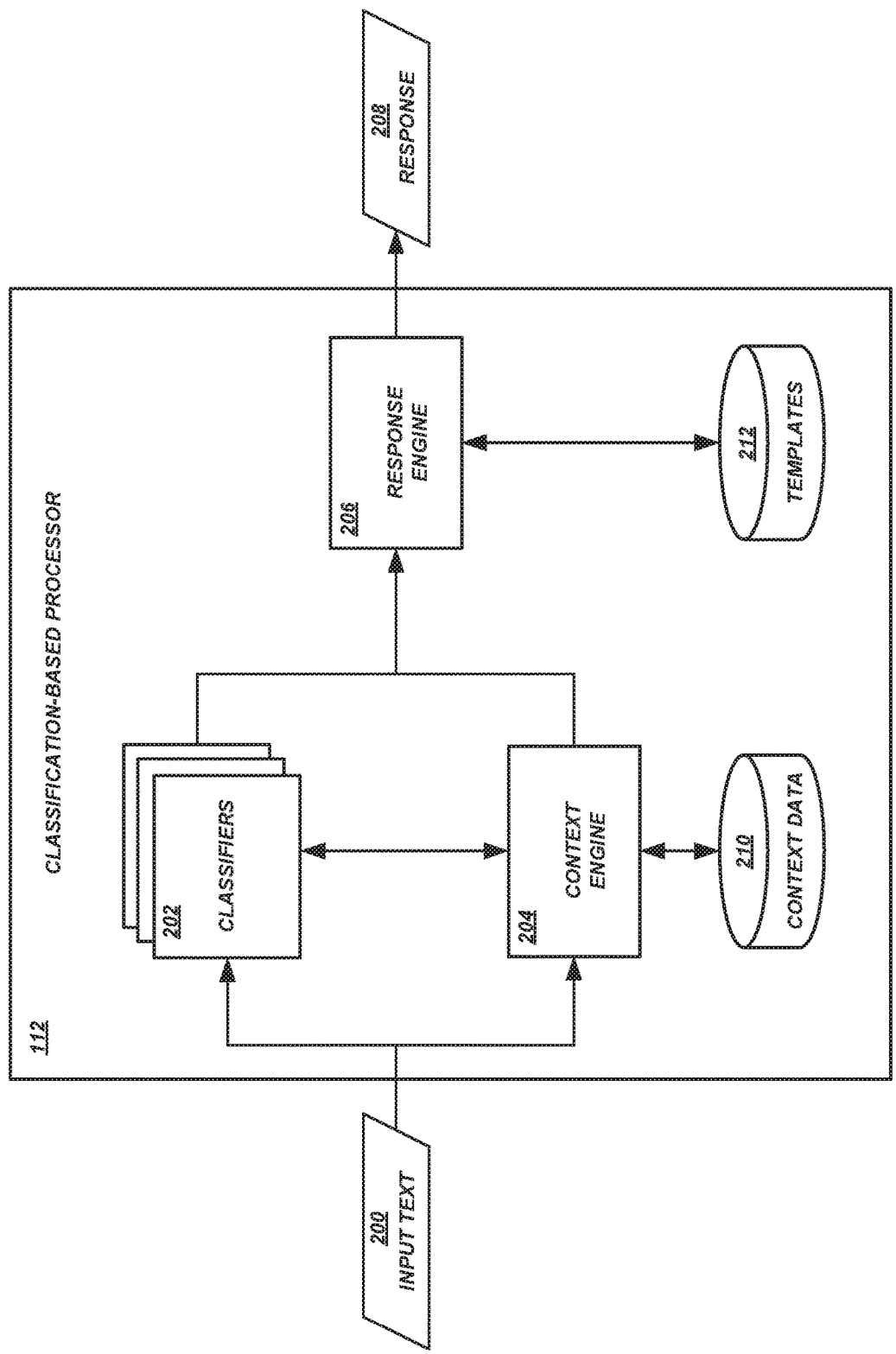
FIG. 2 is a block diagram of various components of a dialogue management system according to some embodiments.

FIG. 2 shows an example of a classification-based processor 112 that may be implemented in a dialogue management system 100. As shown, the classification-based processor 112 may include any number of classifiers 202 for processing input text 200 (and other data, such as contextual data 210) to determine various classifications for a particular user or dialogue. The classification-based processor 112 may also include a context engine 204 for maintaining the context of a dialogue over multiple turns, such as prior classification results, changes to classification results over the course of the dialogue, a transcript or other representation of the dialogue communications, etc. The classification-based processor 112 may also include a response engine that generates a response 208 (or some other output, such as a prompt). The classification-based processor 112 may also include various data stores, such as a context data store 210 to store contextual data used by other components of the classification-based processor 112, and a templates data store 212 to store templates for responses to be provided to user devices 102. The example components and data stores shown in FIG. 2 are illustrative only, and are not intended to be limiting. In some embodiments, a classification-based processor 112 may have fewer, additional, and/or alternative components and data stores.

Generally described, classifiers 202 assign inputs to one or more predetermined classes based on various models, such as statistical models, neural-network-based models, criteria-based and/or rule-based models, etc. The classifiers analyze the input for signals of certain characteristics or states, and produce output representative of the identified characteristics or states. In the classification-based processor 112 shown in FIG. 2, multiple classifiers 202 assign textual input received from a user (or derived from user input) to various classes. Some classifiers may also use other input, such as contextual data regarding the user and/or the current multi-turn dialogue, in performing classification.

Figure 3:
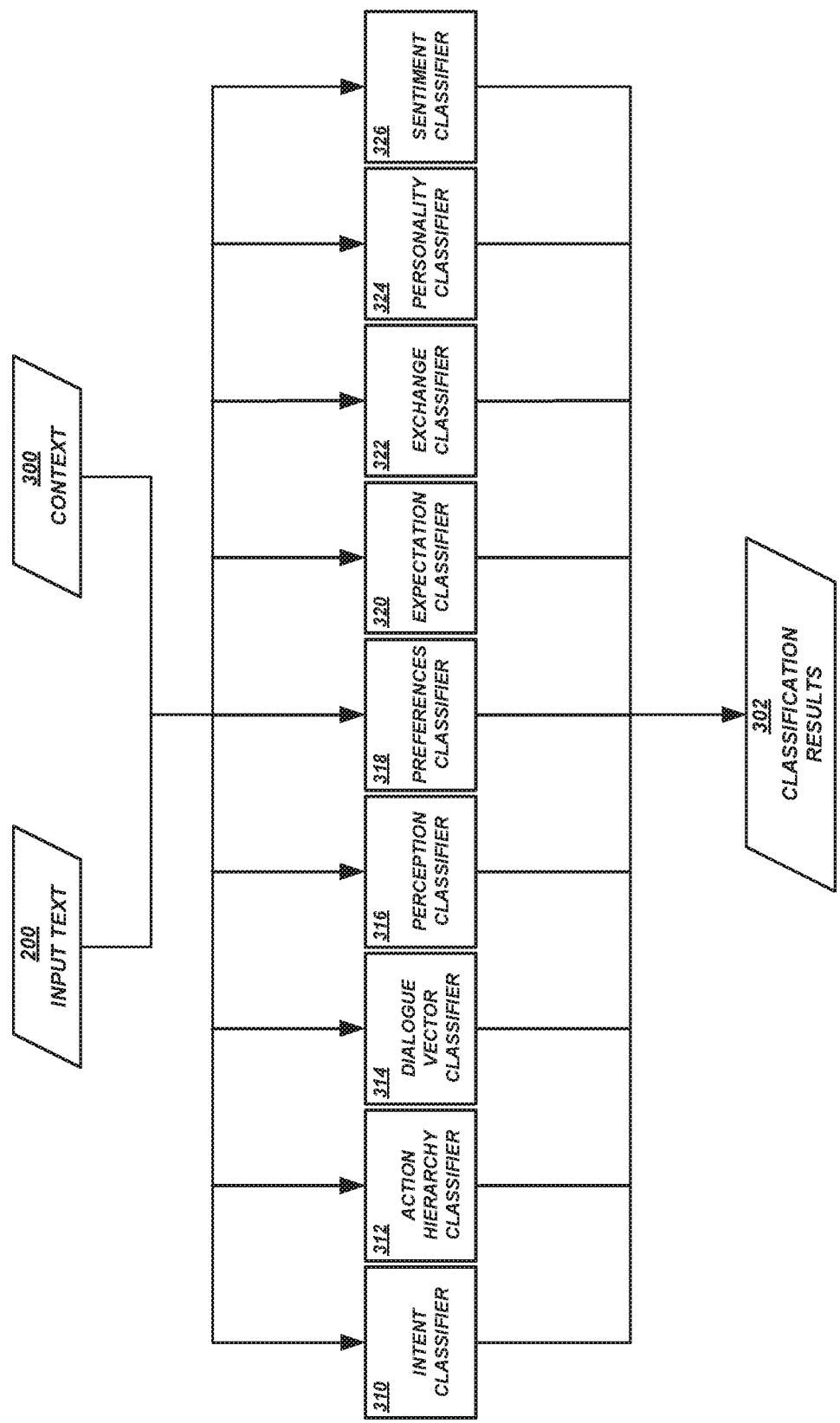
FIG. 3 is a block diagram of various classifiers of a dialogue management system according to some embodiments.

FIG. 3 shows example classifiers that may be implemented in a classification-based processor 112. The example classifiers 202 shown in FIG. 3 are illustrative only, and are not intended to be limiting. In some embodiments, a classification-based processor 112 may implement additional, fewer, and/or alternative classifiers. Individual classifiers may use statistical models, neural-network-based models, criteria-based and/or rule-based models, other types of models, or any combination thereof to facilitate classification of input into one or more classes. In addition, individual classifiers 202 may be implemented in hardware, or in a combination of software and hardware. Each of the example classifiers shown in FIG. 3 is discussed below.

An intent classifier 310 can classify input as one of a set of possible "intents" that the classification-based processor 112 is configured to recognize. An "intent" corresponds to the meaning of an input or the motivation behind an input, such as an action that the provider of the input wishes to perform or have performed. For example, a user of a user device 102 may access a dialogue management system 100 and provide textual input 200. The textual input 200 may in some way reflect the user's intent to set up an appointment, obtain information about a product, initiate a transaction, or the like. The intent classifier 310 can use a natural language understanding ("NLU") model to classify dialogue text 200 as representative of a "schedule appointment" intent, a "browse products" intent, a "purchase product" intent, or some other intent. Such a classification can be used to control subsequent operations of the dialogue management system 100. For example, the output provided to the user device 102 in response to the input 200 can vary depending upon the intent, other classifiers that are used to process the text 200 can vary depending upon the intent, etc. In some embodiments, the intent classifier 310 (or some other classifier or component of the classification-based processor 112) may classify users into one of a set of classes based on a current phase or stage associated with the determined intent of the user. For example, in the context of selling products or services, the intent classifier 310 may classify a user as currently being in the "lead," "appointment," "contract," or "closing" phase.

An action hierarchy classifier 312 can classify input on a hierarchy of levels through which a user is expected to progress before performing a desired action. The levels of the hierarchy may include a first or lowest level that corresponds to an initial state of "desire" by the user, such as the desire to perform some action. The levels of the hierarchy may include a last or highest level that corresponds to a final state of "commitment" by the user, such as a commitment to perform the desired action. In some embodiments, the hierarchy may also include any number of intermediate levels between initial desire and final commitment, such as: a second level (e.g., above the initial "desire" level) that corresponds a recognition by the user of an "ability" to perform the desired action; a third level (e.g., above the second "ability" level) that corresponds to a state of "reason" or logical motivation going beyond mere desire; and a fourth level (e.g., above the third "reason" level and before the final "commitment" level) that corresponds to a state of "need" to perform the action, beyond merely having a logical reason to perform the desired action. In some embodiments, the levels of the action hierarchy are not checkpoints to pass in a strictly linear manner. Rather, a user's input may result in classification in a lower level after previously being classified in a higher level. In addition, a user's input may result in an initial classification at any level, without necessarily beginning at the lowest "desire" level. For example, a user's input may be indicative of proper classification in the "reason" level the first time the action hierarchy classifier 312 is run on input from the user. Subsequent input from the user may be indicative of a "need" level classification, showing that the user has regressed backwards and away from performing the desired action, or that the user had not actually reached the state of reason yet.

The action hierarchy classifier 312 can use a textual analysis of user input to determine a class according to the action hierarchy. For example, the action hierarchy classifier 312 may analyze the frequency with which individual words or word groups appear in input text 200. Words or word groups may be associated with individual levels of the action hierarchy. When a user's input includes words associated with a particular hierarchy level at a higher frequency than words or word groups associated with other levels, then the user (or the user's input) may be determined to be in the particular hierarchy level. An example of an action hierarchy classifier 312 implemented using a word frequency model is described in greater detail below with respect to FIGS. 4 and 5.

A dialogue vector classifier 314 can classify input as one of a set of possible "vectors" that the dialogue vector classifier 314 is configured to recognize. A "vector" corresponds to a direction in which a dialogue is moving, or in which an input is moving the dialogue. For example, a particular multi-turn dialogue may relate to scheduling an appointment, such as a test drive of a car. A user may use words such as "but," "yet," or "instead," which tend to redirect the dialogue (e.g., if the dialogue is progressing towards finalizing a test drive, the use of "but" by the user making the appointment may indicate that the user is now withdrawing from finalizing the test drive). The dialogue vector classifier 314 can classify such input as a "redirect" dialogue vector. This classification can be useful in generating a response. For example, the dialogue management system 100 may respond with vector words to redirect the dialogue back towards a desired outcome (e.g., scheduling the test drive). In some embodiments, the dialogue vector classifier 314 can use a textual analysis of user input to determine a dialogue vector classification, such as the frequency-based classifier described below with respect to the action hierarchy classifier 312.

A perception classifier 316 can classify input as indicative of mode of perception preferred by a user. A particular user may be more visually oriented not only in the way they most effectively perceive external events, but also in the way that they process events internally (e.g., the user may react most strongly to visual stimuli, and may also think in terms of visual concepts such as "seeing things from a particular point of view"). Another user may be more aurally oriented in both perception of external events and processing of internal events (e.g., the user may react most strongly to the way things sound, and may also think in terms of aural concepts such as "being in harmony"). Yet another user may be more kinesthetically oriented in both perception of external events and processing of internal events (e.g., the user may react most strongly or favorably to being active, and may also think in terms of kinesthetic concepts). Determination of a user's preferred mode of perception can be useful in generating a response to the user's input. For example, if a user is classified as "visual," the dialogue management system 100 may focus on the way a car looks and may use phrasing such as "it looks like you're interested scheduling a test drive." Such responses may be more effective in getting the user to actually take the test drive than focusing on the way the car's stereo sounds or using phrasing such as "it sounds like you're interested in scheduling a test drive." In some embodiments, the perception classifier 316 can use a textual analysis of user input to determine a perception mode classification, such as the frequency-based classifier described below with respect to the action hierarchy classifier 312.

A preferences classifier 318 can classify input as indicative of one of a set of possible preferences or "values" held by the user providing the input. A preference corresponds to a feature or concept that a user values over other features or concepts. For example, a particular multi-turn dialogue may relate to purchase of a product, such as a car. A user may provide input regarding possibly driving the user's young children in the car, or input regarding discussing the car with the user's father or financial advisor. The preferences classifier 318 can classify such input as indicative of a preference for "safety" (for the user who will be driving with young children") or for "resale value" (for the user who will be discussing the car with the user's father). This classification can be useful in generating a response. For example, the dialogue management system 100 may highlight the advanced safety features of the car when generating responses to users classified as having a "safety" preference or value. In some embodiments, the preferences classifier 318 can perform NLU on textual input using a neural network that is trained to generate classification scores for each of a predetermined set of preferences or values. An example of a preferences classifier 318 implemented using a neural network model is described in greater detail below with respect to FIGS. 6 and 7.

An expectation classifier 320 can classify input as indicative of a user's expectation for a current multi-turn dialogue. A user's expectation may correspond to whether the user expects to be able to perform a desired action and/or how much dialogue or process the user expects to engage in before performance of the desired action seems realistic. For example, a particular multi-turn dialogue may relate to purchase of a product, such as a car. A user may provide input indicating that the user expects to purchase a car, with the primary question being which car to purchase or where to make the purchase. Another user may provide input indicating that the user expects to obtain a significant amount of information and take a significant amount of time to carefully consider the decision. Assignment of these users to different classes can be useful in generating a response. For example, the dialogue management system 100 may streamline the prompts and accelerate the process towards scheduling a test drive or completing a sale for users who have been assigned to a class indicating their expectation is to purchase a car soon. The dialogue management system 100 may break the process down into smaller steps and generate more prompts or provide additional information for users who have been assigned to a class indicating their expectation is to cautiously obtain information and consider options before committing to making any purchase. In some embodiments, the expectation classifier 320 is implemented using a neural network model trained to generate scores for individual expectation classes based on textual input, such as the neural-network-based classifier described below with respect to the preferences classifier 318.

An exchange classifier 322 can classify input with respect to the exchange of resources between dialogue participants. The resources measured by the exchange classifier 322 may be the resources expected to be exchanged (e.g., provided by a user to the dialogue management system 100 or some other user) while the user is providing input to the dialogue management system 100 on the way to performance of a desired action. In some embodiments, the desired action may be purchase of a product, and the resources measured by the exchange classifier 322 may be "attention" (the user is giving attention to the dialogue management system 100), "time" (the user is spending time conversing with the dialogue management system 100), "trust" (the user is developing trust in the dialogue management system's responses and/or what is being provided or promised to the user), and "action" (the user is committing to performance of an action—in the case of a product purchase, the user is exchanging money for the product). The resources may be assumed to be exchanged in a linear manner; that is, if the exchange classifier 322 determines that user input is in the "trust" class, then the user may be assumed to have exchanged attention and time in addition to trust. Assignment of a user to a class representative of a particular exchanged resource can be useful in generating a response. For example, the dialogue management system 100 may move on from attempting to build credibility and trust if the exchange classifier 322 determines that the user input is in the "trust" class. In some embodiments, the exchange classifier 322 is implemented using a criteria-based model and/or a rule-based model in which aspects of the user's textual input and, optionally, contextual information regarding the dialogue are analyzed with respect to criteria and/or rules that may be different for each class.

In some embodiments, an additional classifier may be used to further analyze and classify input with respect to one of the resources of the exchange classifier 322, or the exchange classifier 322 may include one or more subclassifiers to implement these features. For example, a separate action set classifier may classify input, context, other information, some combination thereof, etc. on a hierarchy of commitment with respect to the "action" resource described above. In one specific, non-limiting embodiment, the commitment hierarchy may include a "possibility" level, an "eventuality" level, a "reality" level, and a "responsibility" level. In this example, the "possibility" level is associated with the lowest likelihood of being ready to perform an action (e.g., exchange the "action" resource), whereas the "responsibility" level may be associated with the highest likelihood of being ready to perform the action. In some embodiments, an action set classifier can use a textual analysis of user input to determine a dialogue vector classification, such as the frequency-based classifier described below with respect to the action hierarchy classifier 312. The levels of the hierarchy may be inversely correlated with ease with which they are implemented. For example, use of words like "if" may be easy to introduce into a dialogue, may be indicative of mere "possibility," and may not represent any commitment to perform an action. Use of words like "when" may be indicative of "eventuality," and use of words like "as" may be indicative of "reality." Use of words like "am" may be require greater context to introduce in a dialogue and be more challenging to introduce, and may therefore represent the highest measured level of commitment to perform an action: "responsibility."

A personality classifier 324 can classify input as representative of one of a set of possible personality types, such as one of the Myers-Briggs personality types. This classification can be useful in generating a response. For example, the dialogue management system 100 may respond with different words, phrases, or entirely different lines of questions or prompts based on the differences between the personality types (e.g., some prompts may be more effective with users of particular personality types than with users of other personality types). In some embodiments, the personality classifier 324 can use a neural network or a frequency-based textual analysis of user input to determine a personality type.

A sentiment classifier 326 can classify input as representative of one of a set of possible sentiments. The possible sentiments may be determined with respect to particular topics, such as being "positive," "negative," or "neutral" with respect to the last dialogue prompt. The possible sentiments may also or alternatively be determined with respect to the user's general outlook or state, such as "angry," "sad," and "happy." Sentiment classification can be useful in generating a response. For example, the dialogue management system 100 may respond with different words, phrases, or entirely different lines of questions or prompts based on the differences between the sentiments. In some embodiments, the sentiment classifier 326 can use a neural network or a frequency-based textual analysis of user input to determine a sentiment class.

Although the classifiers shown in FIG. 3 have been discussed above—and will be further discussed below—in the context of specific implementations, the examples are illustrative only and are not intended to be limiting. In some embodiments, any of the classifiers discussed herein may be implemented using a frequency-based textual model, a neural-network based processing model, a criteria/rule-based model, some other type of model, or any combination thereof. In addition, although FIG. 3 shows the classifiers in a parallel configuration, in some embodiments the classifiers (or some subset thereof) may execute sequentially or asynchronously. In some embodiments, the output (or a portion thereof) of some classifiers may serve as the input (or a portion thereof) to other classifiers.

Example Classification Processes

Figure 4:
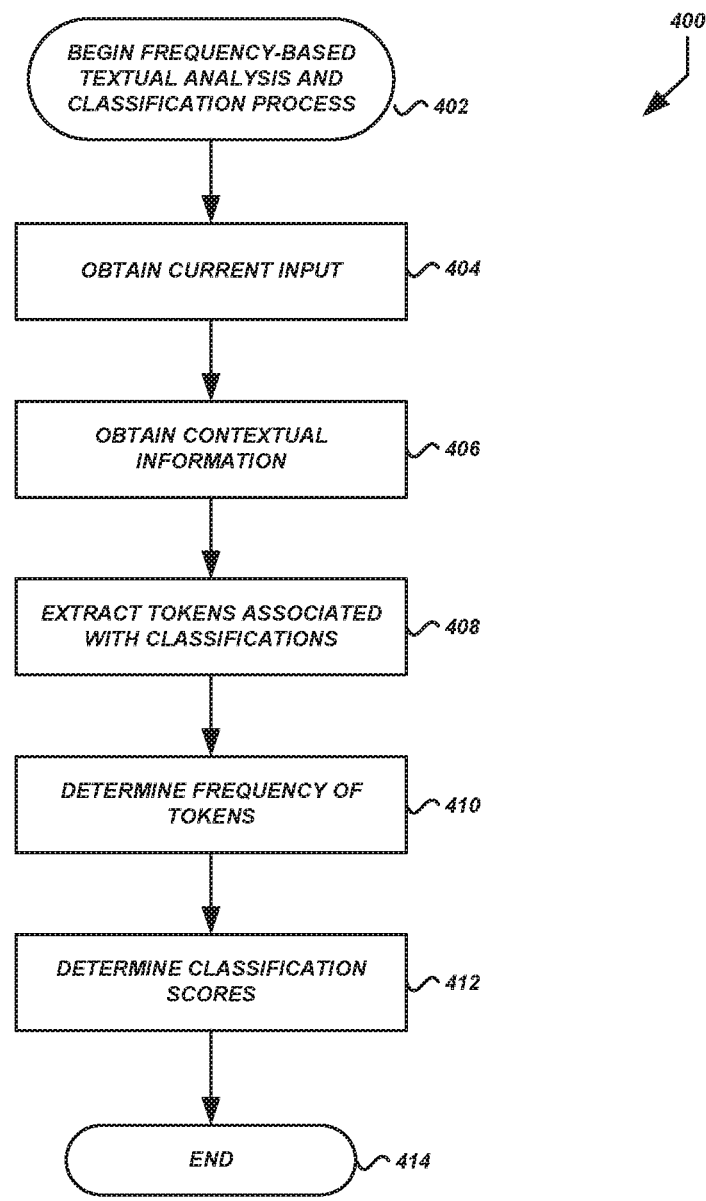
FIG. 4 is a flow diagram of an illustrative classification process according to some embodiments.

FIG. 4 is a flow diagram of an illustrative process 400 that may be executed by a classifier to determine classes for input based on the frequency with which tokens appear in the textual input. The process 400 will be described with respect to the illustrative action hierarchy classifier shown in FIG. 5.

The process 400 shown in FIG. 4 begins at block 402. The process 400 may begin in response to an event, such as when input is received by a dialogue management system 100, when a classification-based processor 112 is instantiated or invoked, etc. When the process 400 is initiated, a set of executable program instructions stored on one or more non-transitory computer-readable media (e.g., hard drive, flash memory, removable media, etc.) may be loaded into memory (e.g., random access memory or "RAM") of a computing device of the dialogue management system 100. The executable instructions may then be executed by a hardware-based computer processor (e.g., a central processing unit or "CPU") of the computing device. In some embodiments, the process 400 or portions thereof may be implemented on multiple processors, serially or in parallel.

Figure 5:
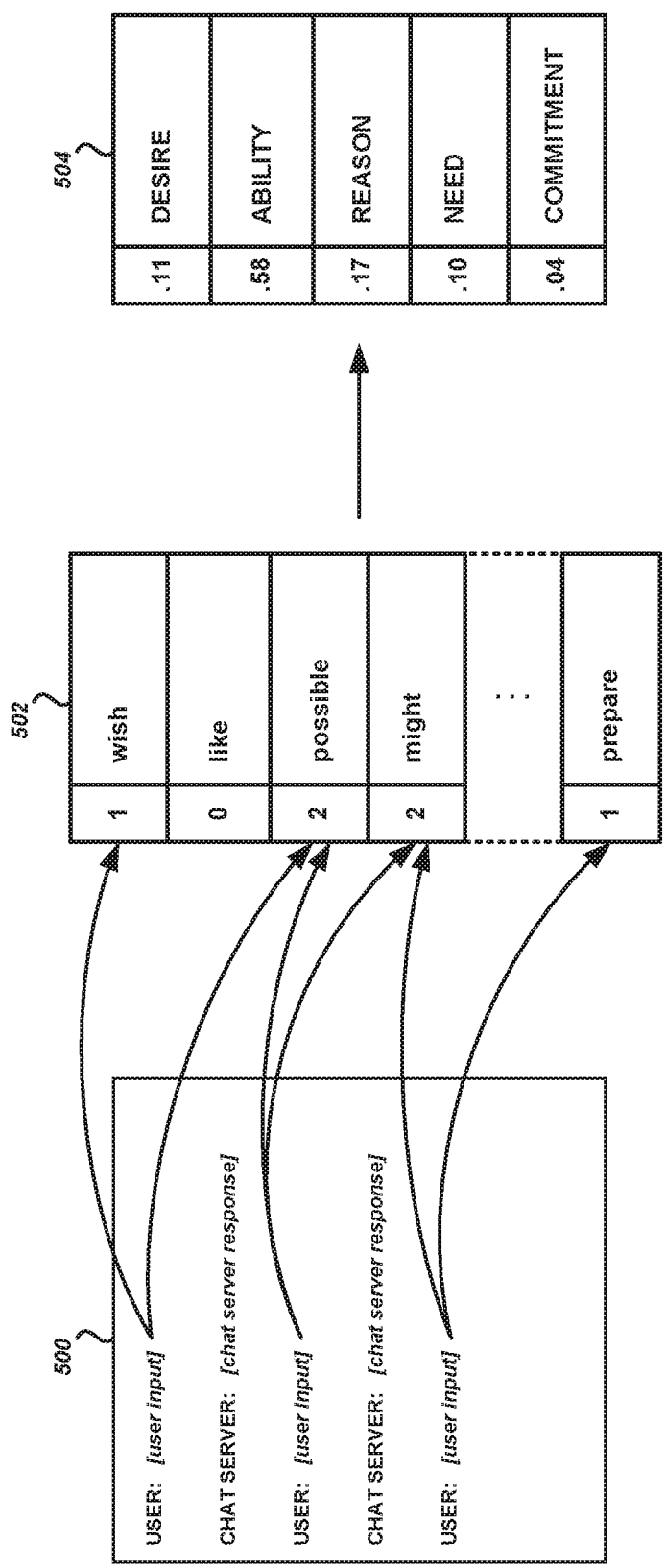
FIG. 5 is a conceptual diagram of an illustrative implementation of action hierarchy classification according to some embodiments.

At block 404, the classifier executing the process 400 (in this example, an action hierarchy classifier) can obtain an input. The input may be text provided by a user of a user device 102 (or generated by an ASR module) during a multi-turn dialogue with the dialogue management system 100. For example, as shown in FIG. 5, the text may be a transcript 500 of an entire multi-turn dialogue, or of the i-most-recent entries by the user during a multi-turn dialogue (where i is a positive integer).

At block 406, the classifier executing the process 400 can obtain contextual information associated with the current input, the current multi-turn dialogue, or the user in general. For example, previous multi-turn dialogues in which the user has engaged may be accessed and used during the action hierarchy classification process.

At block 408, the classifier executing the process 400 can extract tokens associated with the various classes to which the classifier is configured to assign input. For example, the action hierarchy classifier shown in FIG. 5 may be configured to assign input to one of five classes: desire, ability, reason, need, and commitment. There may be a predetermined set of tokens (words or short phrases) associated with each of the classes. Table 1, below, shows an illustrative list of such tokens for each of the classes.

TABLE 1

| Desire | Ability | Reason | Need | Commitment |
| --- | --- | --- | --- | --- |
| Like | Can | Because | Have | Willing |
| Want | Can't | If | Must | Will |
| Hope | Able | Then | Need | Gonna |
| Prefer | May | Also | Should | Going |
| Wanted | Might | First | Ought | Planning |
| Wanting | Could | Second | Important | Ready |
| Preference | Would | Or | Got to | Yes |
| Hoping | Wouldn't | And | | Yeah |
| Preferable | Available | So | | Intend |
| Wish | Could | Next | | Decide |
| | Possible | Than | | Promise |
| | Open to | Once | | Deciding |
| | | Before | | Prepare |
| | | As | | Preparing |
| | | Under | | Prepared |
| | | Over | | |
| | | Only If | | |
| | | Include | | |
| | | Including | | |

At block 410, the classifier executing the process 400 can determine the frequency with which each of the tokens appears in the input. For example, as shown in FIG. 5, each occurrence of each token may be counted, and a counter 502 may be maintained to track the number of occurrences of each token. In some embodiments, each occurrence of a token may be counted separately, even if multiple occurrences of a single token appear in a single dialogue turn. In some embodiments, multiple occurrences of a token in a given dialogue turn may be discounted or weighted. For example, multiple occurrences in a single turn may only be counted as one occurrence regardless of how many occurrences are in the dialogue turn. In some embodiments, occurrences of tokens in previous or "older" dialogue turns are discounted or weighted such that they contribute less to the overall frequency counter for the token.

At block 412, the classifier executing the process 400 can determine classification scores for each class. The classification scores may be determined based on the frequency counter generated above in block 410. FIG. 5 shows an example chart of classification scores 504. In some embodiments, the frequency counts for each token of a particular class are summed, and the total of all frequency counts is then summed. The frequency count for each class may then be divided by the sum of all frequency counts to generate a score for each class. In these cases, the classes with higher frequency counts, and therefore higher proportions of the overall frequency count, will be assigned higher scores than classes with lower frequency counts. In some embodiments, the frequency count ratios may serve as the basis for the overall class score, while other information may also be factored into the final classification score or used to adjust the classification score. For example, context information associated with the dialogue or the user may be used to adjust the classification scores. In some embodiments, individual tokens or groups of tokens may be weighted more heavily than other tokens. For example, a particular token may be assigned a weighting factor that is applied (e.g., multiplied to produce a product) either to the frequency count for the token, or used in determining class scores. Illustratively, a frequency of a particular token may be weighted more heavily than other tokens for a particular class, or more heavily for one class and less heavily for a different class. In some embodiments, other information (e.g., output from other classifiers, or other information altogether) may be factored into the final classification score and used to signal and adjust the classification score. The other information may include whether a communication is inbound or outbound, output of an exchange classifier, etc.

Figure 6:
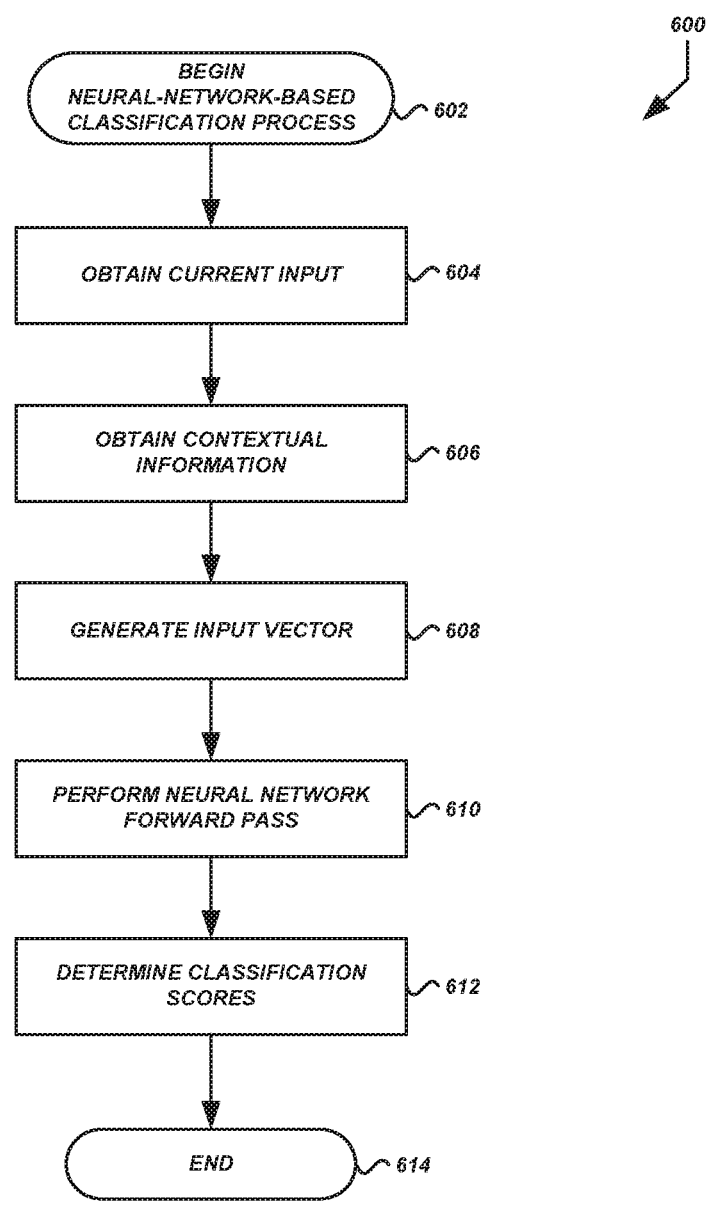
FIG. 6 is a flow diagram of another illustrative classification process according to some embodiments.

FIG. 6 is a flow diagram of an illustrative process 600 that may be executed by a classifier to determine classes for input based on a neural network specifically trained for the task. The process 600 will be described with respect to the illustrative preferences classifier shown in FIG. 7.

The process 600 shown in FIG. 6 begins at block 602. The process 600 may begin in response to an event, such as when input is received by a dialogue management system 100, when a classification-based processor 112 is instantiated or invoked, etc. When the process 600 is initiated, a set of executable program instructions stored on one or more non-transitory computer-readable media (e.g., hard drive, flash memory, removable media, etc.) may be loaded into memory (e.g., random access memory or "RAM") of a computing device of the dialogue management system 100. The executable instructions may then be executed by a hardware-based computer processor (e.g., a central processing unit or "CPU") of the computing device. In some embodiments, the process 600 or portions thereof may be implemented on multiple processors, serially or in parallel.

Figure 7:
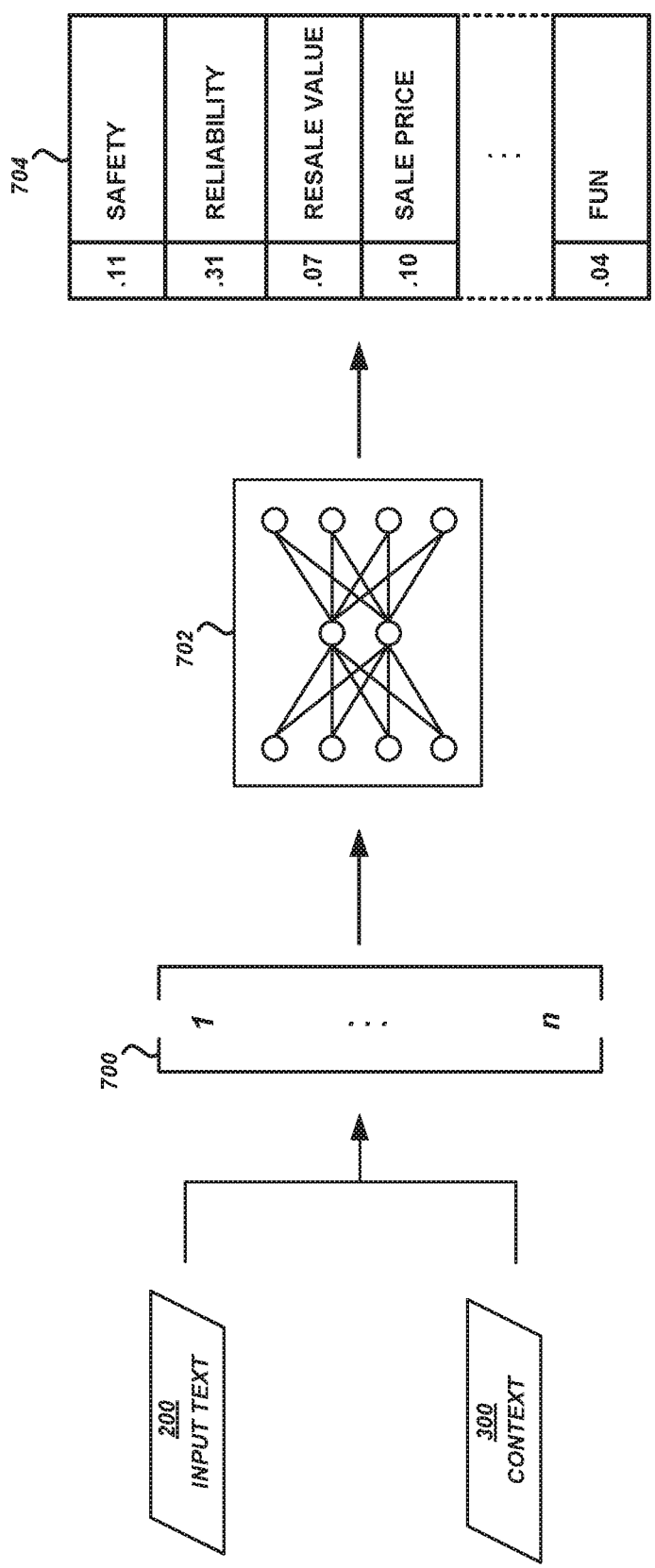
FIG. 7 is a conceptual diagram of an illustrative implementation of user preference classification according to some embodiments.

At block 604, the classifier executing the process 600 (in this example, a preferences classifier) can obtain an input. As shown in FIG. 7, the input may be text 200 provided by a user of a user device 102 (or generated by an ASR module) during a multi-turn dialogue with the dialogue management system 100. In some embodiments, the text may be a transcript of an entire multi-turn dialogue, or of the i-most-recent entries by the user during a multi-turn dialogue (where i is a positive integer).

At block 606, the classifier executing the process 600 can obtain contextual information associated with the current input, the current multi-turn dialogue, or the user in general. For example, previous multi-turn dialogues in which the user engaged may be accessed and used during the preferences classification process.

At block 608, the classifier executing the process 600 can generate one or more input vectors or "feature" vectors for processing by a neural network. For example, the preferences classifier shown in FIG. 7 may use a neural network 702 to generate classification scores 704 for multiple preference classes. The neural network 702 may take, as input, a vector 700 of data to be processed by the neural network 702. The vector 700 may include data regarding the words in the input text 200, various items of context data 300, other information, some combination thereof, etc. Illustratively, the n items in the vector 700 may be referred to as dimensions, and thus the vector 700 may be an n-dimensional vector. In some embodiments, output of other classifiers may be used to signal information to the neural network 702 as information to be incorporated into the vector 700. For example, the output of the action hierarchy classifier 312 and/or various contextual information may be incorporated into the vector 700.

The value for an individual dimension may be a number that is processed by the neural network 702 as described below. In some embodiments, text data (e.g., dialogue input and/or dialogue output) may be incorporated into the vector 700 directly (e.g., as text data) or after processing into numeric form. For example, if prior dialogue output asked the user a specific question, then the next dialogue input may be processed into numeric form. Illustratively, if a user is asked a question with a limited number of possible responses, then the particular response may be mapped to a value that is included in the vector 100. Each value may correspond to a particular category or classification, and therefore multiple inputs responsive to such dialogue prompts can be aggregated, averaged, or otherwise analyzed and used to determine the strength of the input signal with respect to the particular category or classification.

At block 610, the classifier executing the process 600 can perform a neural network forward pass on the vector 700. The forward pass involves multiplying a weight matrix, representing a subset of the parameters of the neural network 702, by the input vector and then applying an activation function to generate an initial result. This initial result may be referred to as an "internal" or "hidden" layer because most neural networks multiply the initial result by at least one other matrix and apply at least one other activation function to generate at least one other result. The process of matrix multiplication and activation function application may be repeated for each internal layer of the neural network 702.

At block 612, the classifier executing the process 600 can determine classification scores for each class. In classification systems, neural-network-based models may generate scores via the forward pass. For example, the last set of results generated by the forward pass (e.g., the "output layer") may include the scores for each class. Individual scores may indicate the probability that the input corresponds to a particular class. In the example shown in FIG. 7, the "reliability" preference may be the class that is most likely correct for the given input text 200 and context 300.

Figure 8:
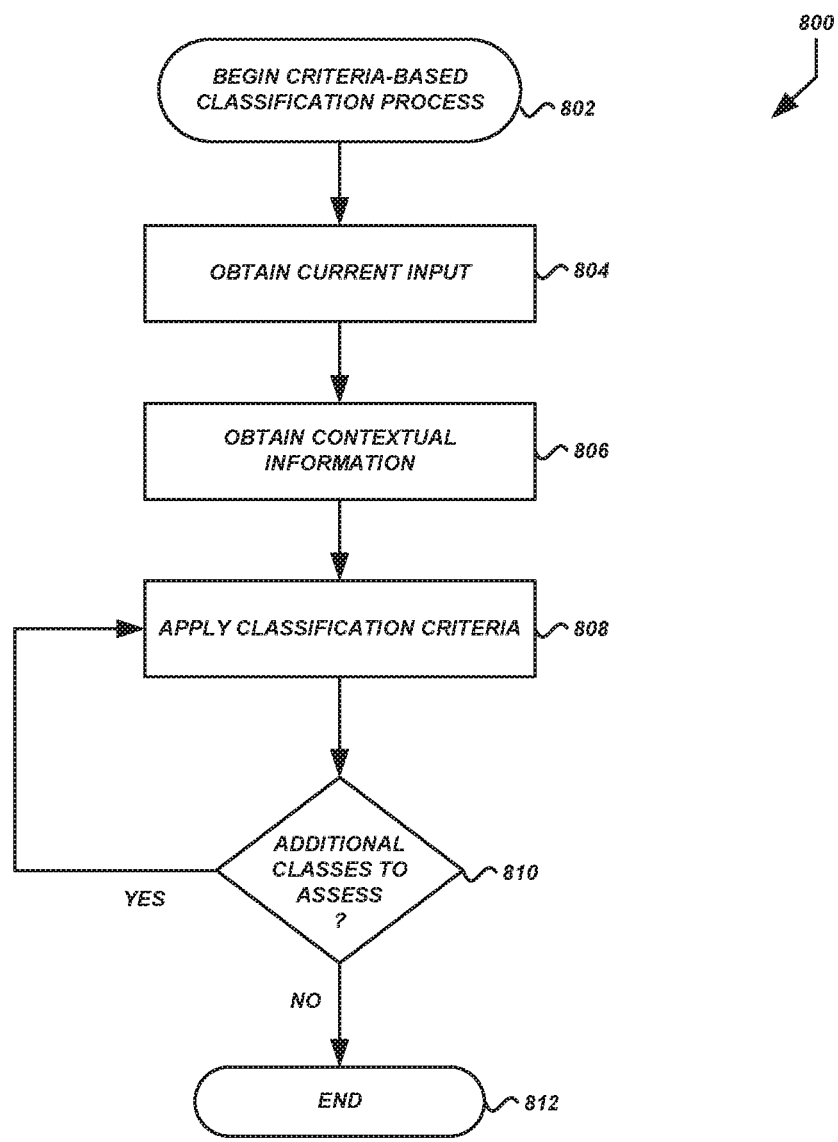
FIG. 8 is a flow diagram of another illustrative classification process according to some embodiments.

FIG. 8 is a flow diagram of an illustrative process 800 that may be executed by a classifier to determine classes for input based on various criteria and/or rules. The process 800 will be described with respect to the illustrative exchange classifier shown in FIG. 9.

The process 800 shown in FIG. 8 begins at block 802. The process 800 may begin in response to an event, such as when input is received by a dialogue management system 100, when a classification-based processor 112 is instantiated or invoked, etc. When the process 800 is initiated, a set of executable program instructions stored on one or more non-transitory computer-readable media (e.g., hard drive, flash memory, removable media, etc.) may be loaded into memory (e.g., random access memory or "RAM") of a computing device of the dialogue management system 100. The executable instructions may then be executed by a hardware-based computer processor (e.g., a central processing unit or "CPU") of the computing device. In some embodiments, the process 800 or portions thereof may be implemented on multiple processors, serially or in parallel.

Figure 9:
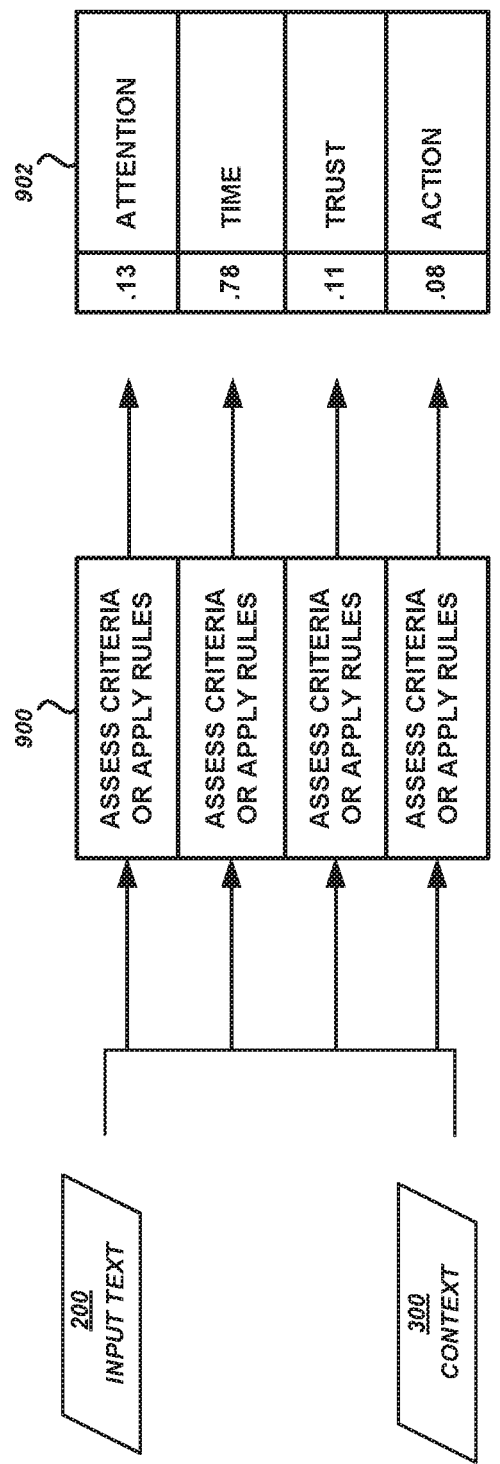
FIG. 9 is a conceptual diagram of an illustrative implementation of exchange classification according to some embodiments.

At block 804, the classifier executing the process 800 (in this example, an exchange classifier) can obtain an input. As shown in FIG. 9, the input may be text 200 provided by a user of a user device 102 (or generated by an ASR module)

during a multi-turn dialogue with the dialogue management system 100. In some embodiments, the text may be a transcript of an entire multi-turn dialogue, or of the i-most-recent entries by the user during a multi-turn dialogue (where i is a positive integer).

At block 806, the classifier executing the process 800 can obtain contextual information associated with the current input, the current multi-turn dialogue, or the user in general. For example, previous multi-turn dialogues in which the user engaged may be accessed and used during the preferences classification process.

At block 808, the classifier executing the process 800 can apply classification criteria and/or rules associated with a class. For example, the exchange classifier shown in FIG. 9 can assess criteria or apply rules 900 that may be specific for each class. The criteria may be rule-based (e.g., if a criterion is met then a value is assigned) or computed (e.g., input analyzed to count or aggregate instances of events). For the "attention" class, the exchange classifier may consider whether the user is responding to the prompts of the dialogue management system 100, has initiated contact with the system in an unscheduled manner, etc. If the user is being responsive and/or has initiated contact with the system in an unprompted or unscheduled manner, the exchange of attention may be noted. For the "time" class, the exchange classifier may consider certain actions the user has performed or commit to perform, such as scheduling a test drive. This consideration may be based on the action hierarchy discussed above (e.g., if the user has reached the "commitment" level, then the exchange of time may be noted). For the "trust" class, the exchange classifier may consider a frequency-based analysis of text. If the user has used a threshold number or percentage of words indicative of trust, then the exchange of trust may be noted. For the "action" class, the exchange classifier may consider certain actions that the user has performed or committed to perform, such as signing a contract or transferring funds.

At decision block 810, the classifier executing the process 800 can determine whether there are additional classes to assess. If so, the process 800 can return to block 808. Otherwise, the process 800 can terminate at block 812. For example, as shown in FIG. 9, the exchange classifier can assess classification criteria and/or rules for each of four different classes. The assessments may occur on a class-by-class basis, and therefore portions of the process 800 may be repeated for each class, or performed in parallel for each class.

Example Response Generation Process

Figure 10:
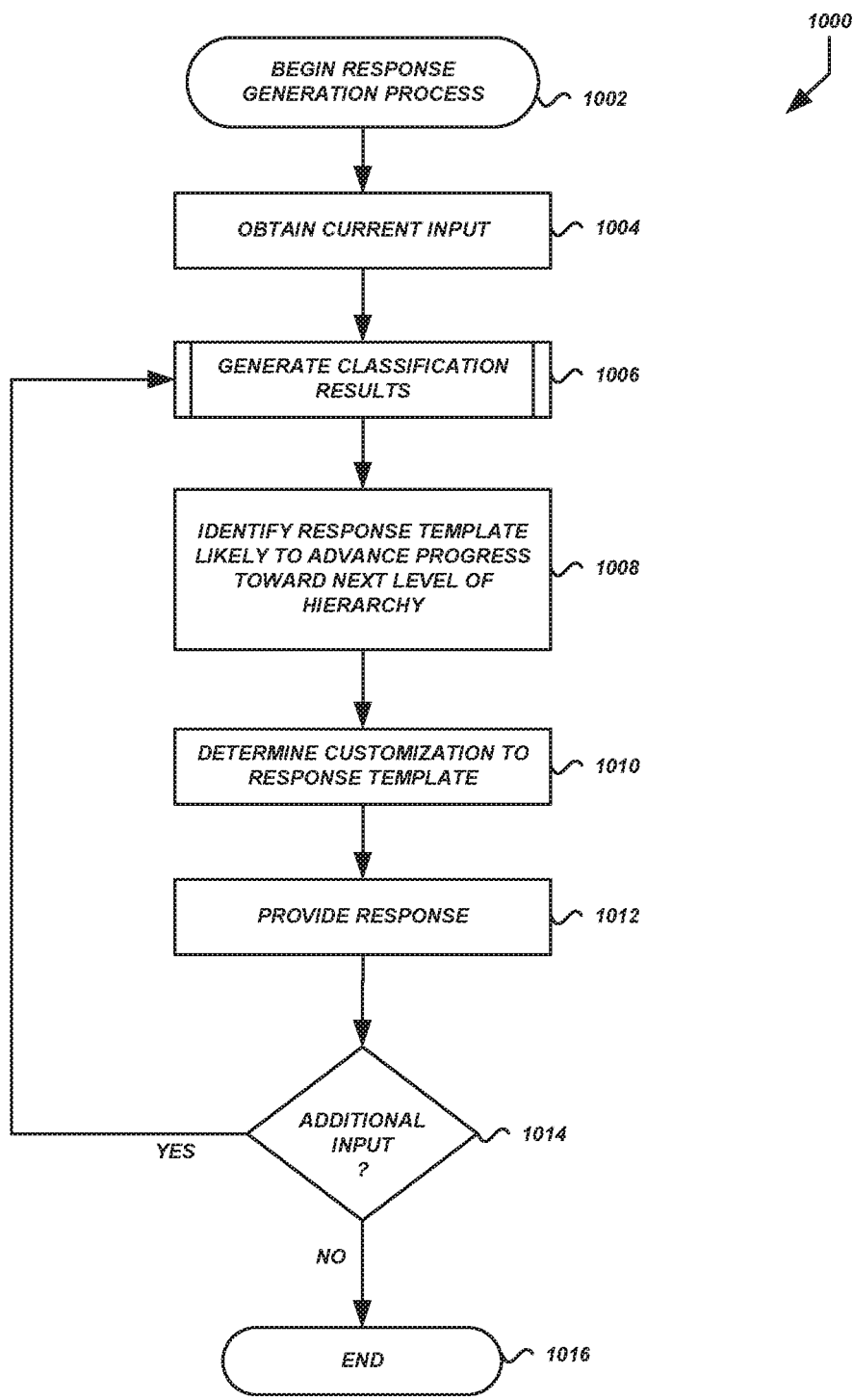
FIG. 10 is a flow diagram of an illustrative dialogue management process according to some embodiments.

FIG. 10 is a flow diagram of an illustrative process 1000 that may be executed by a dialogue management system 100 to generate dialogue responses or other prompts based on user input and classifications determined by one or more classifiers. The process 1000 will be described with reference to the illustrative response engine shown in FIG. 11.

The process 1000 shown in FIG. 10 begins at block 1002. The process 1000 may begin in response to an event, such as when input is received by a dialogue management system 100. When the process 1000 is initiated, a set of executable program instructions stored on one or more non-transitory computer-readable media (e.g., hard drive, flash memory, removable media, etc.) may be loaded into memory (e.g., random access memory or "RAM") of a computing device of the dialogue management system 100. The executable instructions may then be executed by a hardware-based computer processor (e.g., a central processing unit or "CPU") of the computing device. In some embodiments, the process 1000 or portions thereof may be implemented on multiple processors, serially or in parallel.

At block 1004, the dialogue management system 100 can obtain an input. The input may be text provided by a user of a user device 102 (or generated by an ASR module) during a multi-turn dialogue with the dialogue management system 1000.

At block 1006, the dialogue management system 100 or some component thereof, such as a classification-based processor 112, can generate classification results using the input. For example, the various classifiers shown in FIG. 3 may be used to assign the input to various classes as described in greater detail above.

Figure 11:
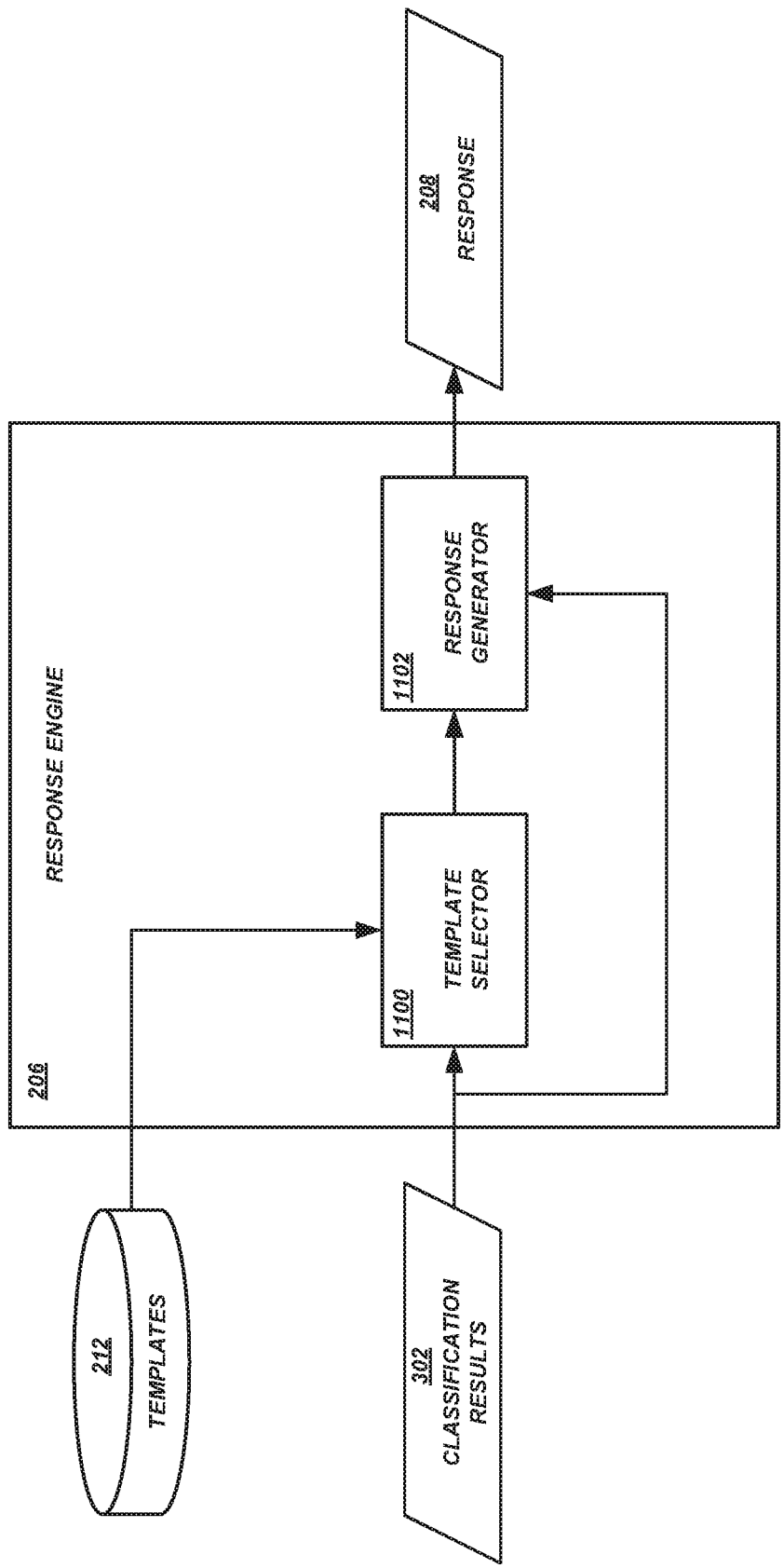
FIG. 11 is a conceptual diagram of an illustrative implementation of dialogue response generation according to some embodiments.

At block 1008, the dialogue management system 100 or some component thereof, such as a response engine 206, can identify a response template that is likely to advance progress of the dialogue toward a desired result, such as a level of the action hierarchy. As shown in FIG. 11, a template selector 1100 can obtain the classification results 302 generated above, and determine which template (or templates) in the templates data store 212 corresponds to the classification results. For example, the templates data store 212 may include a different response template for each possible combination of classification results (e.g., each possible combination of intents, action hierarchy levels, perception modes, preferences, expectations, exchange levels, personality types, and sentiments). In some embodiments, a single template may be associated with multiple different combinations of possible classifications. In some embodiments, a single combination of classifications may be associated with multiple templates, such as a variety of different templates for use depending upon the current context of the dialogue (e.g., what information is required to progress to the next level in the action hierarchy). In some embodiments, templates may not be statically assigned to individual sets of classification results. Instead, templates may be associated with quantifiable characteristics or properties, such as scores representing the relative relevance of the templates for various classifications or combinations of classification results. Then, a set of current classification results and, optionally, additional context is analyzed and the various templates may be scored with respect to the current set of classification results (and context). The highest-scoring template may then be chosen for further processing as described below.

At block 1010, the dialogue management system 100 or some component thereof, such as a response engine 206, can determine one or more customizations to the response template identified above. As shown in FIG. 11, a response generator 1102 can obtain a template selected by the template selector 1100, classification results 302, and/or various other data (e.g., contextual data). The response generator 1102 can then customize the template to generate a processed response 208. For example, a particular response template may be "You <perception class> a <car in context>." The contextual information may show that the user is considering scheduling test drive of a Chevy Camaro. If the perception classifier has determined that the user is in the visually-oriented class, the template may be customized to read "You would look good in a Chevy Camaro." If the perception classifier has determined that the user is in the auditory-oriented class, the template may be customized to read "You'll love the engine sound of a Chevy Camaro." If the perception classifier has determined that the user is in the kinesthetically-oriented class, the template may be customized to read "You'll love the feel of the open road in a Chevy Camaro."

In some embodiments, the response engine 206 can determine which customizations to make to the template using a model that accepts, as input, the identified template, the current classification results, additional context of the dialogue, or some combination thereof. The model (e.g., a neural network, conditional random field, etc.) may generate output that is indicative of which words to place in which portions of the template. For example, if the template has two portions to be customized, as in the "You <perception class> a <car in context>" template described above, the model may generate an output vector comprises two elements: one for each of the portions to be customized. The elements may have numeric values that can be translated, cross-referenced, or otherwise transformed into a word or phrase to be inserted into the appropriate location of the template.

In some embodiments, additional or alternative factors may be used to customize a template at block 1010, or select a template at block 1008. For example, different verb tenses may be used move the user through a process, such as using the future tense in cases where it is desired to have the user plan an action, using the past tense in cases where it is desired to have the user visualize looking back on a desired action, using the present tense to motivate the user to act now, etc.

In some embodiments, templates may be chosen and/or customized such that responses include dialogue vector words to move the user through a process. Dialogue vector words are words (or phrases) that steer and shape the productivity of a conversation. Redirection words such as "but," "yet," "instead," and "so" can be used to redirect a dialogue toward a desired outcome (e.g., if a user backs away from a desired action by using the word "but," the same word can be used to redirect the user back in the direction of the desired action). Linking words such as "and" can be used to link concepts, such as linking a desired action to an action that the user has indicated a willingness to perform. Directional words such as "to" or "because" can continue to move the dialogue in a direction and amplify certain points. Defensive words such as "why" provoke a user to defend a decision or assertion. Invitation words, such as "if" invite a user to move past resistance and take an action without the need for logical leaps. Words such as "or" indicate different options from which a user may choose. A closed "or" can limit the options, while an open-ended "or" can focus the user on certain options while allowing for the possibility of using other options. Equivalence words such as "means" or "is" can be used to indicate the equivalence of two concepts (such as a concept about which the user has shown a positive sentiment, and a concept about which it is desired that the user show a positive sentiment).

In some embodiments, a response template may occasionally be chosen and/or customized in a semi-random manner, or in a manner which does not otherwise follow the predetermined assignments and determinations of the system. For example, a particular dialogue context and set of classification results may lead to selection of a particular response template that has been previously assigned to the set of classification results and that corresponds to the dialogue context. However, rather than choosing that particular template every time the assigned set of classification results and dialogue context correspondence is observed, a different template (or customization to a template) can be chosen in a small, pseudo-random subset of such cases. For example, a template that is next-most-closely associated with the set of classification results and dialogue context may be chosen. As another example, a template that has not been used recently but which still makes sense for the current dialogue context may be chosen (e.g., a template that is still responsive to a question from the dialogue participant, or a template for which all required customization information is available and which will is still likely to move the dialogue forward toward performance of a desired action or another desired goal). By using such alternative responses, the system can obtain real-world feedback regarding the effect of different templates. Such data can be used to automatically or manually adjust the manner in which templates are chosen and/or customized in the future to achieve more desirable results.

In some embodiments, response templates and/or customizations may provide information in an unprompted manner, or request information that can be used to provide such unprompted information. The system can then use participant responses to continue to move the dialogue forward toward performance of a desired action or another desired goal. For example, in a dialogue regarding a possible purchase of a car, a response may be generated that prompts the dialogue participant to provide an estimated daily commute time (e.g., "How long is your daily commute?"). Based on the participant's response, the system can select a follow-up response that provides interesting-but-unprompted information designed to move the user's subsequent responses toward a different classification result (e.g., "Wow, that's a long commute. The average is x minutes. You should consider comfort and interior amenities when choosing a car.").

At block 1012, the dialogue management system 100 or some component thereof, such as the chat server 110, can provide the processed response to the user device 102.

At decision block 1014, the dialogue management system 100 or some component thereof, such as the chat server 110, can determine whether additional input has been received. If so, the process 1000 can return to block 1006. Otherwise, the process 1000 may terminate at block 1016.

In some embodiments, the dialogue management system 100 does not identify and customize a response template. Rather, the dialogue management system 100 generates a response word-by-word or phrase-by-phrase. For example, the dialogue management system 100 may use a generative model that takes input, such as the classification results 302, context 300, and/or other information. The generative model may then "translate" the input into a response (e.g., a question, comment, or answer) without accessing a template and customizing the template. Illustratively, the generative model may be a recurrent neural network ("RNN") that identifies features and dependencies across sequences of events. Because multi-turn dialogues include input and responses occurring in a sequence, a recurrent neural network may provide desired performance.

The generative model may be trained using a corpus of training data that includes sets of training input and desired output. The sets of training input may be examples of multi-turn dialogue input and, in some cases, corresponding system output (e.g., input to the system, output from the system, etc.) over the course of a dialogue leading up to the latest dialogue input. Each set of training data input may be assigned to or otherwise associated with a corresponding desired output, such as the output the is desired from the system when presented with a particular dialogue input or multi-turn dialogue state. The training data inputs may then be processed by the model, and the results compared to the results that correspond to the desired output. For example, classifier data from any or all of the classifiers described above, context data, text data representative of dialogue turns (input and/or output), other information, some combination thereof, etc. may be provided to the model. Input may be processed into vectors, which may be multi-dimensional data structures that include values of classifier output, tokens extracted from dialogue turns, etc. The vectors may then be multiplied by one or more matrices of model parameters to generate results. In some embodiments, regularization functions (e.g., sigmoid) may be applied to transform the results into probabilities or scores.

In some embodiments, output of the model may be a number or collection of numbers that can be translated or otherwise transformed into text data, such as a sentence or phrase to be used to respond to a dialogue input. The desired output may be the number or collection of numbers that, when transformed into text data, represent the "gold standard" or otherwise desired response of the system when presented with such dialogue input or such a dialogue state. Based on the comparison of output to desired output, some or all parameters of the model may be adjusted so that in subsequent executions the results come closer to the desired output. This process may be repeated a predetermined or dynamically determined number of times or until some convergence criteria is met (e.g., the output is within a threshold distance of the desired output).

In use, the generative model may receive input as described above, and generate output. However, as the desired output may not be known ahead of time for this exact set of real-world input, there may not be a step of comparing the output to desired output. Rather, the response generator may proceed with generation of the response 208.

In some embodiments, the dialogue management system 100 may use a hybrid retrieval/generative approach to generating responses. For example, the response engine 206 may first determine a template or set of templates that appear to be most relevant (e.g., highest-scoring) for the current input (e.g., classification results 302, context 300, etc.). If none of the templates appears to be particularly relevant (e.g., if no template is associated with a score that satisfies a threshold), then the response generator 1102 may proceed to generate the response 208 using the generative model, rather than by customizing a template. In some embodiments, the response engine 206 may generate responses using both a retrieval approach and a generative approach, and then select a most-relevant response (e.g., highest-scoring) to use as the response 208.

Example User Interface

Figure 12:
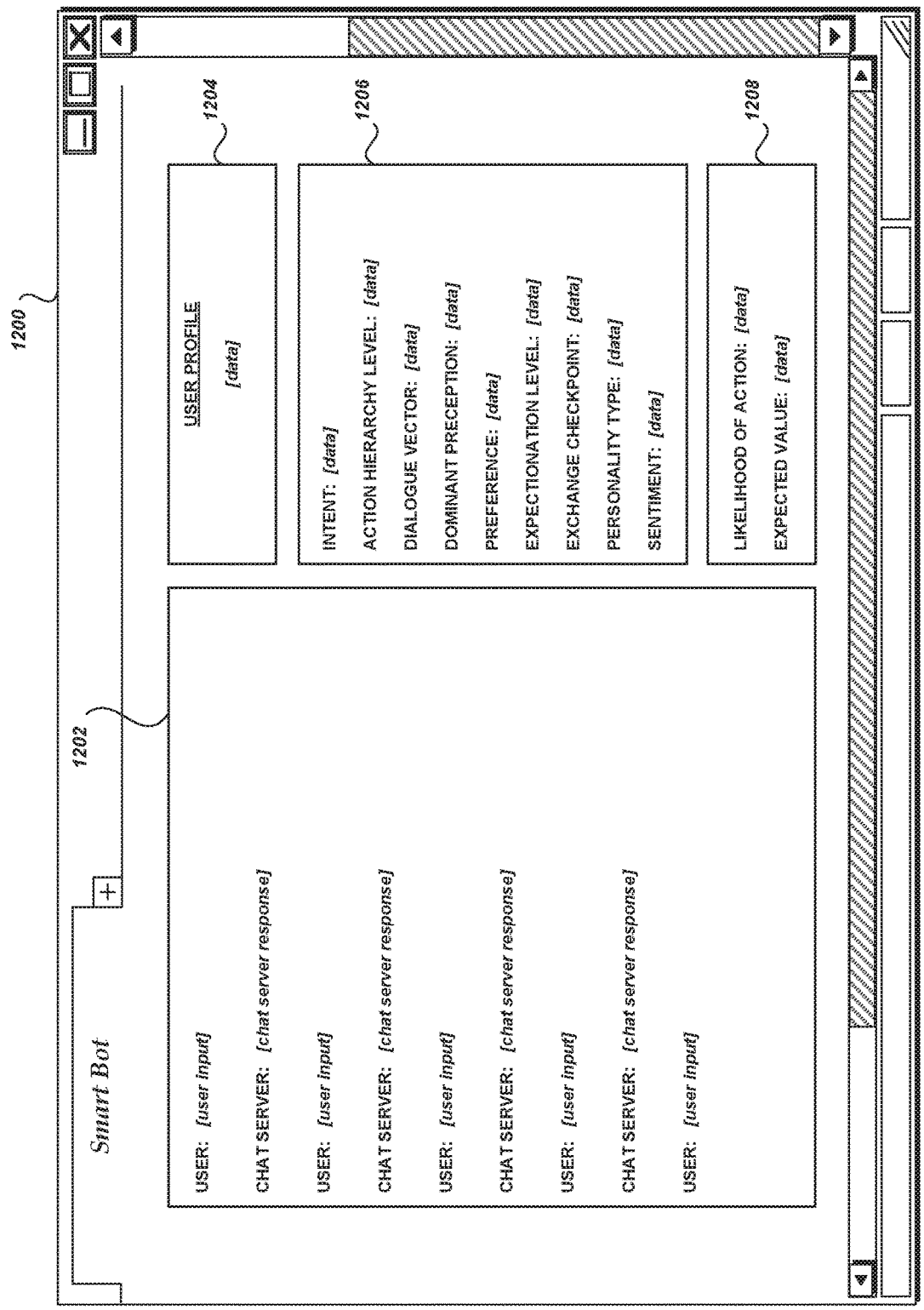
FIG. 12 is a conceptual diagram of an illustrative user interface for presenting a dialogue transcript and classification results according to some embodiments.

FIG. 12 shows an example user interface 1200 that the dialogue management system 100 can use to present the results of an ongoing or previous dialogue. For example, the user interface 1200 can be presented to a person (e.g., customer service representative, therapist, etc.) currently engaging in an interactive dialogue with a user of a user device 102. The person can see the transcript 1202 of the dialogue, profile information 1204 about the user with whom they are communicating, classification results 1206 generated from the transcript 1202, and summary results 1208 that may correspond to the current "bottom line" estimates for this dialogue. In some embodiments, the user interface 1200 can be presented to a person after an automated dialogue between a user of a user device 102 and the dialogue management system 100. For example, if a user accesses the dialogue management system 100 to obtain information about a car and schedule a test drive, the results of that dialogue can be transmitted to a data consumer 104, such as the car dealership at which the user is to take the test drive. A customer service representative at the car dealership may access the user interface 1200 before meeting the user for the test drive. In this way, the customer service representative can obtain information regarding what the user communicated to the dialogue management system 100 during the dialogue, and what classes the dialogue management system 100 has determined for the user.

In some embodiments, the user interface 1200 can present accumulated information regarding multiple dialogues, possibly with multiple parties. For example, dialogue transcripts and/or classification results may be accumulated over the course of interactions with an automated chat server for (1) setting up a test drive appointment and (2) conversing with a dealer representative regarding the test drive or follow-up negotiations. Dealer representatives may supplement the information with their own observations, copies of emails exchanged with the dialogue participant, etc. In this way, the classifications can continue to be updated and leveraged by other staff at the dealership even after the initial computer-based dialogue, such as by financing specialists who typically interact with a person only after the purchase decision has been finalized.

Some inventive aspects of the disclosure are set forth in the following clauses:

1. A computer-implemented method comprising:
    under control of a computing system comprising one or more computing devices configured to execute specific instructions,
    receiving text corresponding to one or more inputs of a user; and
    in response to an input of the one or more inputs:
        processing at least a portion of the text in a first classifier, wherein the first classifier generates a first plurality of scores, wherein individual scores of the first plurality of scores correspond to individual levels in a hierarchy, wherein individual levels in the hierarchy correspond to individual phases preceding performance of an action, and wherein the first plurality of scores are generated using a model that maps individual words of the text to individual levels in the hierarchy;
        processing at least a portion of the text in a second classifier, wherein the second classifier generates a second plurality of scores, wherein individual scores of the second plurality of scores correspond to individual user preferences associated with the action, and wherein the second plurality of scores are generated using a neural network trained to generate scores corresponding to a plurality of user preferences associated with the action;
        identifying a response template based at least partly on a level of the hierarchy associated with a highest score of the first plurality of scores;
        generating a response using the response template and a customization to the response template, wherein the customization is based at least partly on a user preference associated with a highest score of the second plurality of scores; and
        presenting the response.

2. The computer-implemented method of clause 1, further comprising identifying the template based at least partly on a likelihood that processing text, corresponding to a subsequent input of the user, in the first classifier will produce a result corresponding to a progression of the user to a higher level of the hierarchy.

3. The computer-implemented method of clause 1, further comprising processing at least a portion of the text in a third classifier, wherein the third classifier generates a third plurality of scores, wherein generating the response is further based at least partly on a highest score of the third plurality of scores.

4. The computer-implemented method of clause 3, wherein individual scores of the third plurality of scores correspond to individual resources of a plurality of resources expected to be exchanged by the user preceding performance of the action, and wherein the highest score of the third plurality of scores corresponds to a resource, of the plurality of resources, likely to be exchanged by the user.

5. The computer-implemented method of clause 3, wherein individual scores of the third plurality of scores correspond to individual modes of perception of a plurality of modes of perception, and wherein the highest score of the third plurality of scores corresponds to a mode of perception, of the plurality of modes of perception, likely to be preferred by the user.

6. The computer-implemented method of clause 3, wherein individual scores of the third plurality of scores correspond to individual expectations of a plurality of expectations regarding successfully performing action, and wherein the highest score of the third plurality of scores corresponds to an expectation, of the plurality of expectations, likely to be associated with the user.

7. The computer-implemented method of clause 1, further comprising identifying a vector word to be included in the response, wherein the vector word is identified based at least partly on a desired direction of a dialogue, and wherein the response comprises the vector word.

8. The computer-implemented method of clause 1, wherein the action comprises one from a group consisting of: making a purchase, and changing a behavior.

9. The computer-implemented method of clause 1, further comprising providing to a second computing system:
  at least a portion of the text;
  data indicative of the level corresponding to the highest score of the first plurality of scores; and
  data indicative of the preference corresponding to the highest score of the second plurality of scores.

10. A computer-implemented method comprising:
  under control of a computing system comprising one or more computing devices configured to execute specific instructions,
    obtaining text corresponding to one or more inputs of a user, wherein the one or more inputs are provided by the user to the computing system during a multi-turn dialogue associated with an action;
    obtaining a textual model comprising a plurality of words, a plurality of classes, and a plurality of mappings,
      wherein individual mappings of the plurality of mappings map a word of the plurality of words to a class of the plurality of classes, and
      wherein individual classes of the plurality of classes correspond to individual levels of a hierarchy comprising a plurality of levels through which classification of input is expected to progress before performance of the action;
    determining frequencies with which at least a subset of plurality of words occurs in the text;
    identifying a level of the plurality of levels based at least partly on the level being associated with higher frequencies than other levels of the plurality of levels; and
    classifying the user as likely being associated with the level.

11. The computer-implemented method of clause 10, further comprising:
  processing at least a portion of the text in a classifier, wherein the classifier generates a plurality of scores; and
  classifying the user as also being associated with a class corresponding to a highest score of the plurality of scores.

12. The computer-implemented method of clause 11, wherein individual scores of the plurality of scores correspond to individual resources of a plurality of resources expected to be exchanged by the user preceding performance of the action, and wherein the highest score of the plurality of scores corresponds to a resource, of the plurality of resources, likely to be exchanged by the user.

13. The computer-implemented method of clause 11, wherein individual scores of the plurality of scores correspond to individual modes of perception of a plurality of modes of perception, and wherein the highest score of the plurality of scores corresponds to a mode of perception, of the plurality of modes of perception, likely to be preferred by the user.

14. The computer-implemented method of clause 11, wherein individual scores of the plurality of scores correspond to individual expectations of a plurality of expectations associated with action, and wherein the highest score of the plurality of scores corresponds to an expectation, of the plurality of expectations, likely to be associated with the user.

15. The computer-implemented method of clause 10, wherein the action comprises one from a group consisting of: making a purchase, and changing a behavior.

16. The computer-implemented method of clause 10, further comprising providing to a second computing system:
  at least a portion of the text; and
  data indicative of the level with which the user is associated.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
under control of a computing system comprising one or more computing devices configured to execute specific instructions,
obtaining a corpus of training data pairs, wherein individual training data pairs of the corpus comprise a training data input and a corresponding desired output, wherein the training data input comprises multi-turn dialogue text data and dialogue classification data, and wherein the corresponding desired output comprises multi-turn dialogue response data to which the training data input is to be mapped;
training a neural-network-based response generation model using the corpus of training data pairs, wherein the response generation model is trained to generate response generation model output data representing a multi-turn dialogue response;
receiving text corresponding to one or more inputs of a user; and
in response to an input of the one or more inputs:
processing at least a portion of the text in a first classifier,
wherein the first classifier generates a first plurality of scores, wherein individual scores of the first plurality of scores correspond to individual levels in a hierarchy,
wherein individual levels in the hierarchy correspond to individual phases preceding performance of an action, and
wherein the first plurality of scores are generated using a model that maps individual words of the text to individual levels in the hierarchy; processing at least a portion of the text in a second classifier,
wherein the second classifier generates a second plurality of scores, wherein individual scores of the second plurality of scores correspond to individual modes of perception of a plurality of modes of perception, and
wherein a highest score of the second plurality of scores corresponds to a first mode of perception, of the plurality of modes of perception, likely to be preferred by the user;
identifying a response template based at least partly on a level of the hierarchy associated with a highest score of the first plurality of scores;
determining whether the response template is associated with a relevance score that satisfies a threshold;
in response to determining that the response template is associated with a relevance score that satisfies the threshold, generating a response using the response template and a customization to the response template, wherein the customization comprises text associated with the first mode of perception;
in response to determining that the response template is associated with a relevance score that does not satisfy the threshold, generating the response using the response generation model, wherein the response comprises a textual transformation applied to response generation model output data that is generated using at least the portion of the text; and
presenting the response.

2. The computer-implemented method of claim 1, further comprising identifying the template based at least partly on a likelihood that processing text, corresponding to a subsequent input of the user, in the first classifier will produce a result corresponding to a progression of the user to a higher level of the hierarchy.

3. The computer-implemented method of claim 1, further comprising processing at least a portion of the text in a third classifier,
- wherein the third classifier generates a third plurality of scores,
- wherein individual scores of the third plurality of scores correspond to individual resources of a plurality of resources expected to be exchanged by the user preceding performance of the action,
- wherein a highest score of the third plurality of scores corresponds to a resource, of the plurality of resources, likely to be exchanged by the user, and
- wherein generating the response is further based at least partly on the highest score of the third plurality of scores.

4. The computer-implemented method of claim 3, wherein individual scores of the third plurality of scores correspond to individual expectations of a plurality of expectations regarding successfully performing action, and wherein the highest score of the third plurality of scores corresponds to an expectation, of the plurality of expectations, likely to be associated with the user.

5. The computer-implemented method of claim 1, further comprising identifying a textual vector word to be included in the response, wherein the textual vector word corresponds to one of: a change in a conversional direction or a desired conversational direction.

6. The computer-implemented method of claim 1, wherein the action comprises one from a group consisting of: making a purchase, and changing a behavior.

7. The computer-implemented method of claim 1, further comprising providing to a second computing system:
- at least a portion of the text;
- data indicative of the level corresponding to the highest score of the first plurality of scores; and
- data indicative of the preference corresponding to the highest score of the second plurality of scores.

8. A system comprising:
- computer-readable memory storing executable instructions; and
- one or more processors programmed by the executable instructions to at least:
  - obtain a corpus of training data pairs, wherein individual training data pairs of the corpus comprise a training data input and a corresponding desired output, wherein the training data input comprises multi-turn dialogue text data and dialogue classification data, and wherein the corresponding desired output comprises multi-turn dialogue response data to which the training data input is to be mapped;
  - train a neural-network-based response generation model using the corpus of training data pairs, wherein the response generation model is trained to generate response generation model output data representing a multi-turn dialogue response;
  - receive text corresponding to one or more inputs of a user; and
  - in response to an input of the one or more inputs:
    - process at least a portion of the text in a first classifier,
      - wherein the first classifier generates a first plurality of scores, wherein individual scores of the first plurality of scores correspond to individual levels in a hierarchy,
      - wherein individual levels in the hierarchy correspond to individual phases preceding performance of an action, and
      - wherein the first plurality of scores are generated using a model that maps individual words of the text to individual levels in the hierarchy; process at least a portion of the text in a second classifier,
      - wherein the second classifier generates a second plurality of scores, wherein individual scores of the second plurality of scores correspond to individual modes of perception of a plurality of modes of perception, and
      - wherein a highest score of the second plurality of scores corresponds to a first mode of perception, of the plurality of modes of perception, likely to be preferred by the user;
    - identify a response template based at least partly on a level of the hierarchy associated with a highest score of the first plurality of scores;
    - determine whether the response template is associated with a relevance score that satisfies a threshold;
    - in response to determining that the response template is associated with a relevance score that satisfies the threshold, generate a response using the response template and a customization to the response template, wherein the customization comprises text associated with the first mode of perception;
    - in response to determining that the response template is associated with a relevance score that does not satisfy the threshold, generate the response using the response generation model, wherein the response comprises a textual transformation applied to response generation model output data that is generated using at least the portion of the text; and
    - present the response.

9. The system of claim 8, wherein the one or more processors are further programmed by the executable instructions to identify the template based at least partly on a likelihood that processing text, corresponding to a subsequent input of the user, in the first classifier will produce a result corresponding to a progression of the user to a higher level of the hierarchy.

10. The system of claim 8, wherein the one or more processors are further programmed by the executable instructions to process at least a portion of the text in a third classifier, wherein the third classifier generates a third plurality of scores, wherein generating the response is further based at least partly on a highest score of the third plurality of scores.

11. The system of claim 10, wherein individual scores of the third plurality of scores correspond to individual expectations of a plurality of expectations regarding successfully performing an action, and wherein the highest score of the third plurality of scores corresponds to an expectation, of the plurality of expectations, likely to be associated with the user.

12. The system of claim 8, wherein the one or more processors are further programmed by the executable instructions to identify a textual vector word to be included in the response, wherein the textual vector word corresponds to one of: a change in a conversional direction or a desired conversational direction.

13. A non-transitory computer storage medium storing executable code, wherein the executable code configures a computing system to perform a process comprising:
receiving text corresponding to one or more inputs of a user; and
in response to an input of the one or more inputs:
processing at least a portion of the text in a first classifier,
wherein the first classifier generates a first plurality of scores, wherein individual scores of the first plurality of scores correspond to individual levels in a hierarchy,
wherein individual levels in the hierarchy correspond to individual phases preceding performance of an action, and
wherein the first plurality of scores are generated using a model that maps individual words of the text to individual levels in the hierarchy; processing at least a portion of the text in a second classifier,
wherein the second classifier generates a second plurality of scores, wherein individual scores of the second plurality of scores correspond to individual modes of perception of a plurality of modes of perception, and
wherein a highest score of the second plurality of scores corresponds to a first mode of perception, of the plurality of modes of perception, likely to be preferred by the user;
identifying a response template based at least partly on a level of the hierarchy associated with a highest score of the first plurality of scores;
generating a response using the response template and a customization to the response template, wherein the customization comprises text associated with the first mode of perception; and
presenting the response.

14. The non-transitory computer storage medium of claim 13, the process further comprising identifying the template based at least partly on a likelihood that processing text, corresponding to a subsequent input of the user, in the first classifier will produce a result corresponding to a progression of the user to a higher level of the hierarchy.

15. The non-transitory computer storage medium of claim 13, the process further comprising processing at least a portion of the text in a third classifier, wherein the third classifier generates a third plurality of scores, wherein generating the response is further based at least partly on a highest score of the third plurality of scores.

16. The non-transitory computer storage medium of claim 13, wherein the processing at least the portion of the text in the second classifier comprises:
determining, for each mode of perception of the plurality of modes of perception, a corresponding score of the second plurality of scores based on:
a frequency with which one or more words associated with the mode of perception are included in the portion of the text; and
a weight associated with at least one word associated with the mode of perception.

17. The non-transitory computer storage medium of claim 16, wherein the determining, for each mode of perception of the plurality of modes of perception, the corresponding score of the second plurality of scores is based further on a second weight associated with at least a second word associated with the mode of perception, wherein the second weight is different than the weight associated with the at least one word associated with the mode of perception.

18. The non-transitory computer storage medium of claim 13, wherein the identifying the response template comprises:
determining a first response template that corresponds to results of the processing at least the portion of the text in the first classifier and in the second classifier; and
determining, based at least partly on a pseudo-random output, to use a second response template instead of the first response template.

19. The non-transitory computer storage medium of claim 13, wherein the identifying the response template comprises:
identifying the response template from a plurality of response templates based on:
the first mode of perception, associated with the highest score of the second plurality of scores; and
the level of the hierarchy, associated with the highest score of the first plurality of scores;
wherein each response template of the plurality of response templates is associated with at least one combination of a mode of perception and a level of the hierarchy.

20. The non-transitory computer storage medium of claim 13, wherein the identifying the response template is based further on: an expected effect on a score generated by the first classifier in response to a second input of the input or more inputs.

* * * * *